(12) United States Patent
Lunde et al.

(10) Patent No.: US 12,729,079 B2
(45) Date of Patent: Sep. 8, 2026

(54) SYSTEM AND PROCESS FOR COLLECTING WASTE OBJECTS

(71) Applicant: Tomra Systems ASA, Asker (NO)

(72) Inventors: Tom Lunde, Blommenholm (NO); Fredrik Pettersen, Oslo (NO)

(73) Assignee: Tomra Systems ASA, Asker (NO)

( * ) Notice: Subject to any disclaimer, the term of this patent is extended or adjusted under 35 U.S.C. 154(b) by 689 days.

(21) Appl. No.: 18/005,732

(22) PCT Filed: Jul. 15, 2021

(86) PCT No.: PCT/EP2021/069733

§ 371 (c)(1),
(2) Date: Jan. 17, 2023

(87) PCT Pub. No.: WO2022/013343

PCT Pub. Date: Jan. 20, 2022

(65) Prior Publication Data

US 2023/0312272 A1 Oct. 5, 2023

(30) Foreign Application Priority Data

Jul. 17, 2020 (EP) .................................... 20186482
Jul. 17, 2020 (EP) .................................... 20186485

(51) Int. Cl.
*B65G 65/23* (2006.01)
*B65G 47/40* (2006.01)

(52) U.S. Cl.
CPC ............ *B65G 65/23* (2013.01); *B65G 47/40* (2013.01); *B65G 2201/0244* (2013.01); *B65G 2201/0252* (2013.01)

(58) Field of Classification Search
CPC ............................ B65G 19/14; G07F 7/0609
See application file for complete search history.

(56) References Cited

U.S. PATENT DOCUMENTS 2,750,024 A 6/1956 Gurewitz
4,241,821 A 12/1980 Wu et al.
(Continued)

FOREIGN PATENT DOCUMENTS

CN 208802444 U 4/2019
DE 10340244 A1 * 3/2005 ............ B30B 9/325
(Continued)

OTHER PUBLICATIONS

Machine translation of DE10340244 from espacenet. (Year: 2005).*
(Continued)

*Primary Examiner* — Mark C Hageman
(74) *Attorney, Agent, or Firm* — .Buchanan Ingersoll & Rooney PC

(57) ABSTRACT

A system for collecting waste objects for recycling including a reverse vending machine, RVM, and a carrier arrangement adapted to receive a devaluated waste object at a first location having a first elevation, and adapted to transport and deliver the devaluated waste object to a second location having a higher elevation than the first location and an inlet of the RVM. The system further includes a buffer arrangement adapted to receive the devaluated waste object from the RVM at a third location and to deliver the devaluated waste object to the carrier arrangement at the first location. The carrier arrangement includes at least one carrier adapted to move repeatedly between the first location and the second location. Further, a process of transporting and collecting waste objects.

14 Claims, 16 Drawing Sheets

(56) References Cited

U.S. PATENT DOCUMENTS

| | | | | |
|---|---|---|---|---|
| 4,324,325 | A | 4/1982 | Dewoolfson | |
| 4,472,819 | A * | 9/1984 | Constantino | G07F 7/0609 377/6 |
| 4,480,737 | A | 11/1984 | Jamgochian | |
| 4,542,688 | A * | 9/1985 | Bohan | G07F 17/3244 100/902 |
| 5,355,987 | A * | 10/1994 | DeWoolfson | G07F 7/0609 209/583 |
| 6,199,702 | B1 * | 3/2001 | Buer | B03B 9/061 209/930 |
| 6,575,290 | B2 | 6/2003 | Loning et al. | |
| 9,598,248 | B2 * | 3/2017 | Raiche | A01K 1/0128 |
| 9,604,790 | B2 | 3/2017 | Jacobsen et al. | |
| 11,952,209 | B2 * | 4/2024 | Dowdell | B65F 1/1431 |
| 2012/0118700 | A1 * | 5/2012 | Handschick | G07F 7/0609 198/370.01 |

FOREIGN PATENT DOCUMENTS

| | | | | |
|---|---|---|---|---|
| EP | 0561148 | A2 | 9/1993 | |
| EP | 0612046 | B1 | 10/1999 | |
| EP | 2759988 | A1 | 7/2014 | |
| EP | 2953871 | A1 | 12/2015 | |
| GB | 2097162 | A * | 10/1982 | B65G 15/42 |
| JP | H06286805 | A | 10/1994 | |
| JP | H10119045 | A | 5/1998 | |
| WO | 2014122305 | A1 | 8/2014 | |

OTHER PUBLICATIONS

Office Action (Notice of Reasons for Refusal) issued on Mar. 31, 2025 by the Japanese Patent Office in corresponding Japanese Patent Application No. 2023-503151, and an English Translation of the Office Action. (9 pages).

International Search Report (PCT/ISA/210) and Written Opinion (PCT/ISA/237) mailed on Oct. 26, 2021, by the European Patent Office as the International Searching Authority for International Application No. PCT/EP2021/069733. (12 pages).

McGuire, Patrick M., "Chapter 4: Belt Conveyors", "Conveyors: Application, Selection, and Integration", Aug. 5, 2009, pp. 35-69, CP055830109, ISBN:978-1-4398-0390-5. (36 pages).

Reece, Edwin V., "Bulk Solids Handling", Chemical Engineering, Apr. 1, 1985, pp. 38-52, vol. 92, No. 9, XP001408061, New York, NY, USA. (15 pages).

Search Report issued on Oct. 10, 2025, by the Intellectual Property Office of Singapore corresponding to Application No. 11202261656W, (2 pages).

Written Opinion issued on Oct. 13, 2025, by the Intellectual Property Office of Singapore corresponding to Application No. 11202261656W, (8 pages).

Office Action (the First Office Action) issued on May 27, 2026, by the State Intellectual Property Office of the People's Republic of China in corresponding Chinese Patent Application No. 202180059859.8, and an English Translation of the Office Action. (12 pages).

New Zealand Office Action dated Jul. 27, 2026, issued in corresponding in NZ Patent Application No. 797289 (6 pages).

* cited by examiner 1
100
101
102
103
105
200
201
202
203
204
205
206
207
208
210
300
300
301
302
303
400
400
401
402
403
403
404
405
406
407

304
302
301
303
203
201
207
208
202

304
302
301
303
209
207
208
201
203
202

301
304
302
209
207
208
201
203
202

452
454
453
451
455
456
450

452
454
453
451
455
456
450

400
401
401'
407
301
300

1
301
300
311
310
100
407
400
400
407

361
360
354
2
351
359

361
355
2
351
263

356
363
354
355
2
352
357
358
353
351
261
262
264
263

351
2
363
360
354
359

2
363
351
360
354
359

SYSTEM AND PROCESS FOR COLLECTING WASTE OBJECTS

TECHNICAL FIELD

The present disclosure relates to a system for collecting waste objects for recycling, such as deposit-return objects. The system comprises a container return system having an inlet, recognition means and an outlet for a waste object. It also comprises a carrier arrangement adapted to receive the waste object from the container return system at a first location having a first elevation, and adapted to transport and deliver the waste object to a second location for storage or further transport, the second location having a second elevation which is vertically seen higher than the first elevation.

The disclosure also relates to a process of transporting and collecting waste objects by a system for collecting waste objects for recycling, such as deposit-return objects, the system comprising a container return system, a buffer arrangement and a carrier arrangement

Background

A container return system, for example a reverse vending machine (RVM), is generally arranged to collect waste containers for recycling. This may include used, and in particular emptied beverage containers, or other waste material. Many countries today have mandatory recycling laws or container deposit legislation. For some types of waste containers and in some countries the return is made in exchange for money or vouchers. Some container return systems provide stand-alone solutions, for example integrating means for sorting, compressing and storing the collected containers in a stand-alone unit. The container return system may however need to collect large numbers of waste containers for recycling in a short period of time. In many installations, the container return system delivers the received containers to a backroom receiving facility. Depending on the needed storage capacity of the system, the required space can be substantial. The system can also be complex, potentially requiring multiple means for sorting, crushing or compacting, conveying, rerouting, and storing the received containers. The space requirement and the complexity adds cost to the system. In addition, the path of the received containers must be protected from tampering in order to prevent fraud. This level of control further adds to the complexity and cost of the system.

In a typical installation, the crushed or compressed objects are routed to a bin or roller cage where they are stored in plastic bags. The plastic bag is replaced only when full, after which it is set aside, waiting for pick-up by e.g. a garbage truck. This requires available space to store the full plastic bag. Operation of the container return system may also need to be interrupted while changing the bag.

Waste containers returned for recycling, such as empty beverage bottles or cans, often contain residual liquids, which may come into contact with operational parts of the system. Care has to be taken that the sticky residue does not impair operation of the system, which may require frequent cleaning. The more complex the system and the more parts the waste containers touch, the more delicate such cleaning operation may be. Additionally, the residue may cause unpleasant smells, disturbing both workers and users/customers.

SUMMARY

In light of the above, it is an object of the present disclosure to alleviate at least some of the drawbacks and to provide a more efficient and versatile system for collecting waste objects for recycling, as well as an improved process of collecting and transporting waste objects by such a system.

According to a first aspect of the disclosure, there is provided a system for collecting waste objects for recycling, such as deposit-return objects, comprising:

- a container return system having an inlet, recognition means and an outlet for a waste object; and
- a carrier arrangement adapted to receive the waste object from the container return system at a first location having a first elevation, and adapted to transport and deliver the waste object to a second location for storage or further transport, the second location having a second elevation which is vertically seen higher than the first elevation;

wherein

- the system further comprises a buffer arrangement which is adapted to receive the waste object from the container return system, and which is adapted to deliver the waste object to the carrier arrangement, whereby the buffer arrangement enables the container return system and the carrier arrangement to be operable independently from one another.

According to a second aspect of the disclosure, there is provided a system for collecting waste objects for recycling, said waste objects being deposit-return objects, comprising:

- a reverse vending machine, RVM, having an inlet, recognition means, devaluation means, and an outlet for a waste object, which RVM is adapted to devaluate said waste object before it reaches said outlet, and
- a carrier arrangement adapted to receive the devaluated waste object from the RVM at a first location having a first elevation, and adapted to transport and deliver the devaluated waste object to a second location for storage or further transport, the second location having a second elevation which is vertically seen higher than the first elevation and higher than said inlet of the RVM, wherein

- the system further comprises a buffer arrangement adapted to receive the devaluated waste object from the RVM at a third location optionally having a third elevation different from the first and second elevations, and to deliver the devaluated waste object to the carrier arrangement at the first location, and
- the carrier arrangement comprises at least one carrier adapted to move repeatedly between the first location and the second location.

In the context of this application, a container return system may be any system adapted to e.g. collect, sort, crush, compact and/or convey waste containers for recycling including deposit return objects, such as empty beverage bottles and cans, of any size and material, such as PET, aluminum, tin, or glass. Such a system may be used by professional operators, for example in recycling centers collecting used beverage containers from the restaurant industry. An example of such a system is the device for singulation of used beverage containers received in bulk described in EP2953871A1. A container return system may also be a reverse vending machine (RVM) located, for example, in a supermarket, where and end-consumer feeds used beverage containers into the reverse vending machine. In such cases only the front of the RVM is typically visible and accessible to the end-consumer, with a backroom receiving facility only accessible to store employees or other authorized personnel. Further, recognition means, in the context of this application, refers to a device for recognizing the object, for example its shape or its material, and/or determining whether the object is to be collected by the system or not, in other words determining that the object is valid.

The present disclosure is at least partly based on the realization that the space in a typical container return system backroom receiving facility can be much more efficiently used. The combination of features described above, with a carrier arrangement adapted to receive the waste object from a container return system at a first location having a first elevation, and adapted to transport and deliver the waste object to a second location having a second elevation which is vertically seen higher than the first elevation enables the system to take advantage of the available vertical space in the backroom facility, especially when the elevation is steep. The footprint of the system can thus be reduced, allowing for installation in spaces that would otherwise not be adapted. Taking advantage of vertical space can also increase the storage space available for a given footprint. Secondly, the buffer arrangement placed between the container return system and the carrier arrangement in a material stream that has waste objects collected and received by the container return system move from the container return system to the carrier arrangement via the buffer arrangement, allows the container return system to remain operational independently of the operation of the carrier arrangement as containers may be temporarily stored in the buffer arrangement while waiting for being transported by carrier arrangement. In this way a discontinuous and/or parallel flow of containers can be managed.

In general, the waste objects are fed into the container return system at a certain height, and each operation on the waste container such as inspection and devaluation costs height and/or floor space. Every loss in elevation places limits on the system downstream, in terms of space available for further operations or storage, why prior designs have been careful not to waste floor-space and thus adding to the footprint of the system. Providing a carrier arrangement adapted to transport the waste object from a first location to a second location in a steep elevation or substantially vertical direction removes or alleviates the need to minimize elevation loss, since the waste objects can be lifted again in a floor-space efficient manner. It leads to potential cost savings since, for instance, a high-cost, compact-design compactor can be replaced by one more spacious low cost compactor, or two compact less powerful low-cost compactors in sequence. A high degree of compaction can be achieved by compacting the waste objects in several stages with multiple compactors in vertical succession. In addition, the system may be designed with a lower inlet of an RVM, for example for accessibility purposes.

In some countries, it is required that the waste object is tracked by the system until it is devaluated, in order to prevent fraud. Providing devaluation means early in the material stream from inlet of the container return system or the RVM therefore removes potential costs associated with tracking over longer distances. The devaluation means may e.g. be arranged at most 3 m from the inlet, or at most 2 m from the inlet or at most 1 m from the inlet.

In the following, some embodiments and further advantages in relation to the first and second aspects of the disclosure will be discussed. Unless otherwise stated and as far as they are compatible, the embodiments and advantages apply to both the first and the second aspect of the disclosure.

According to an embodiment, said transport of the waste objects the first location to the second location is substantially vertical.

According to one example said carrier arrangement of said first aspect comprises a carrier for transporting said waste objects between said first and second location.

According to one example the system according to said first aspect said buffer arrangement adapted to receive the waste object from the container return system at a third location and to deliver the waste object to the carrier arrangement at the first location.

According to an embodiment of the second aspect said displacement of the at least one carrier between the first location and the second location is substantially vertical.

Additionally or alternatively, said transport of the waste objects and/or said displacement of the at least one carrier between the first location and the second location deviates from the vertical by at most 5°, or at most 10°, or at most 15°. In other words, it occurs at an angle within the range of 85° to 90°, or within the range of 80° to 90°, or within the range of 75° to 90° relative a horizontal plane.

In general, a substantially vertical displacement of the carrier and/or within the ranges discussed above saves valuable floor space and provides for a more compact system. With a substantially vertical displacement, the carrier arrangement can transport waste objects to a second location of any elevation without substantially increasing the footprint of the system. The first location can have a low elevation, and be as close to the floor, without increasing the footprint of the system.

According to an embodiment, the third elevation is vertically seen higher than the first elevation and lower than the second elevation.

According to an embodiment, the third elevation is vertically seen lower than said outlet of the container return system/the RVM, and said buffer arrangement is adapted to receive the waste object from the container return system/the RVM at the third location, which waste object is preferably dropped from said outlet of the container return system/the RVM to the third location.

This allows for a simple, space and energy efficient transfer of the waste object from the outlet of the container return system/the RVM to the buffer arrangement.

In relation to this disclosure the expression "the container return system/the RVM" is used when discussing features present in embodiments of both the container return system of the first aspect, and the RVM of the second aspect. Consequently, the above sentence discusses two aspects: "This allows for a simple, space and energy efficient transfer of the waste object from the outlet of the container return system to the buffer arrangement." AND "This allows for a simple, space and energy efficient transfer of the waste object from the outlet of the RVM to the buffer arrangement."

According to an embodiment, the buffer arrangement comprises sliding means adapted to transport the waste object from the third location to the first location. In other words, the buffer arrangement is arranged such that a waste object received by the buffer arrangement at the third location may be transported to the first location by sliding on a surface of the buffer arrangement e.g. due to the act of gravity.

This provides for a simple and energy efficient system in which the waste object is transported to the first location by gravity.

According to an embodiment of the second aspect, a horizontal distance between said inlet of the RVM and the second location is within the range of 50 cm to 200 cm, or 80 cm to 170 cm or 100 cm to 150 cm and/or a vertical distance between said inlet of the RVM and the second location is within the range of 50 cm to 300 cm, or 50 cm to 200 cm, or 75 cm to 150 cm and/or a vertical distance between the first location and the second location is within the range of 50 cm to 400 cm, or 50 cm to 300 cm, or 100 cm to 300 cm, or 100 cm to 250 cm and/or a vertical distance between the first location and the third location is within the range of 20 cm to 150 cm, or 20 cm to 120 cm, or 30 cm to 100 cm.

According to an embodiment, the carrier arrangement is one of a closed loop path carrier arrangement or a shuttle path carrier arrangement, wherein:

a closed loop path carrier arrangement is configured in such a way that the at least one carrier is adapted to move repeatedly between the first location and the second location along a closed loop path, a displacement of the at least one carrier from the first location to the second location occurring on a different portion of the path than a displacement of the at least one carrier from the second location to the first location, and a shuttle path carrier arrangement is configured in such a way that the at least one carrier is adapted to move repeatedly between the first location and the second location along a shuttle path, a displacement of the at least one carrier from the first location to the second location occurring on the same portion of the path as a displacement of the at least one carrier from the second location to the first location.

According to an embodiment, the at least one carrier is adapted to transport and deliver at least 2, at least 5, at least 10, or at least 20 waste objects or devaluated waste objects concurrently during a displacement between the first location and the second location. Additionally or alternatively, the at least one carrier is adapted to transport and deliver at most 50, or at most 25 waste objects concurrently during a displacement between the first location and the second location.

According to an embodiment, the at least one carrier is a paddle having a generally flat surface adapted to push said waste object in a tubular structure of the carrier arrangement.

According to one embodiment, the flat surface configured to push said devaluated waste object is shorter than the maximum length of the waste object that the RVM or the system for collecting waste objects is configured to accept. According to one example the maximum length of the waste object that the RVM or the system for collecting waste objects is configured to accept is within the range of 300 mm to 350 mm, and is the height of a 1.5 L drinking PET bottle. Other RVM:s or systems for collecting waste objects may be configured to accept object of a larger or smaller dimension. When the flat surface configured to push the objects is shorter than the maximum length of the waste object, there is no direction in which the extension of the flat surface used for pushing is longer than the maximum length of the object. When the maximum length of the object is 330 mm, the flat surface used for pushing is shorter than 330 mm in all directions.

According to one embodiment, the flat surface configured to push said devaluated waste object is at least 30% shorter than the maximum length of the waste object that the RVM or the system for collecting waste objects is configured to accept. Consequently, if e.g. this maximum length is 330 mm, the flat surface used for pushing is shorter than 231 mm in all directions.

According to one embodiment, the flat surface configured to push said devaluated waste object is at least 40% shorter, or at least 45% shorter, or at least 50% shorter than the maximum length of the waste object that the RVM or the system for collecting waste objects is configured to accept.

According to one embodiment, the flat surface configured to push said devaluated waste object is at least 45% shorter than the maximum length of the waste object that the RVM or the system for collecting waste objects is configured to accept in one direction; an at least 50% shorter than the maximum length of the waste object that the RVM or the system for collecting waste objects is configured to accept in another direction orthogonal to said first direction.

According to one example the flat surface is substantially rectangular and optionally having rounded corners.

According to one example the flat surface has a width within the range of 150 mm to 200 mm e.g. 172 mm, and a depth within the range of 130 mm to 170 mm e.g. 152 mm; optionally the surface has a width within the range of 160 mm to 190 mm, and a depth within the range of 140 mm to 160 mm, optionally the surface has a width within the range of 165 mm to 185 mm, and a depth within the range of 145 mm to 160 mm, optionally the surface has a width within the range of 168 mm to 178 mm, and a depth within the range of 147 mm to 157 mm. These measures are of particular advantage when transporting devaluated drinking can and PET-bottles having a maximum height within the range of 300 mm to 350 mm and similar objects.

In relation to this disclosure, a tubular structure refers to a hollow structure providing side walls parallel to the path of the at least one carrier. Should a waste object fall off the at least one carrier, the side walls prevent the waste object from falling outside of the tubular structure. The side walls may be solid, rigid walls, or may be made of a flexible material such as a thin plate or a net. The side walls may have openings small enough to prevent waste objects to pass through the openings. The tubular structure may have a cross-section of any appropriate shape.

According to an embodiment, said at least one carrier is a container having a bottom surface and at least one support wall extending generally perpendicularly to said bottom surface, along an edge of said bottom surface, and/or said at least one container is bowled or bucket shaped and has a carrying volume within the range of 1 L to 25 L. According to one example the container may carry more than 25 or more than 50 object per transport.

According to an embodiment, said at least one carrier has a generally flat surface adapted to push said waste object in a tubular structure of the carrier arrangement, the extension of said generally flat surface substantially corresponding to a cross section of said tube structure, so as to prevent said waste object from falling off said carrier during a displacement of the at least one carrier between the first location and the second location.

This provides for an effective transportation of the waste object.

According to an embodiment of the second aspect, the carrier arrangement is a closed loop path carrier arrangement and comprises a plurality of carriers adapted to move repeatedly between the first location and the second location along said closed loop path.

This allows the capacity of the carrier arrangement, in terms of number of waste objects transported, to be increased by increasing the number of carriers.

According to an embodiment of the second aspect, the carrier arrangement is a shuttle path carrier arrangement and comprises a single carrier adapted to move repeatedly between the first location and the second location along said shuttle path.

According to an embodiment of the first aspect, the buffer arrangement is adapted to deliver the waste object to the carrier concurrently with the carrier arrangement being located in the first location.

The buffer arrangement is consequently adapted to operate in close cooperation with the carrier arrangement, which in turn is adapted to lift the waste object from the first location to the second location.

According to an embodiment, the container return system/the RVM is adapted to receive waste objects of different materials and/or different sizes, and the waste objects of different materials and/or different sizes are mixed together.

The complexity of the system can thus be significantly decreased. If local standards for the collection of recyclable objects allow for different materials to be mixed, such a system can thus provide cost savings.

According to an embodiment, the carrier arrangement has at least two compartments for carrying waste objects, each compartment of the at least two compartments preferably being adapted for carrying waste objects of different materials and/or different sizes.

This configuration may be advantageous if local standards and regulations for the collection of recyclable objects do not allow for the mixing of different materials. It may achieve separate material streams using a single carrier arrangement.

According to an embodiment, the system further comprises at least one additional carrier arrangement adapted to transport and deliver the waste object for storage or further transport, and at least one additional buffer arrangement adapted to deliver the waste object to the additional carrier arrangement.

Depending on the required processing and/or storage capacity of the system and the available space, this configuration may be more advantageous in cases where different materials are kept separate. Each carrier arrangement may deliver the waste objects to a separate location.

According to an embodiment, the buffer arrangement is adapted to selectively deliver the waste object to the carrier arrangement or to the additional carrier arrangement.

This allows for a system comprising fewer buffer arrangements than carrier arrangements, which may save space.

According to an embodiment, the buffer arrangement has a first condition, in which the waste object received by the buffer arrangement is buffered therein, and a second condition, in which the waste object received by the buffer arrangement is delivered to the carrier arrangement.

In relation to this disclosure the expression "the condition of object A" may refer to the orientation of object A. Object a may e.g. be pivotable around an axis between a first orientation/condition and a second orientation/condition. Additionally and/or alternatively, "the condition of object A may refer to object A being opened or closed".

The first orientation or condition allows for the buffer arrangement to buffer the waste objects until the carrier arrangement is ready to receive the waste object from the buffer arrangement, whereupon the buffer arrangement is set in its second condition or orientation so that the buffered objects are transferred to the carrier arrangement. There may be several reasons for the carrier arrangement to be unavailable for receiving waste objects, such as being full, is being emptied or being cleaned etc.

According to an embodiment of the first aspect, the carrier arrangement comprises at least one independently operable carrier adapted to move between the first location and the second location.

An independently operable carrier may for example take the shape of a bucket, basket or other receptacle moving between the first location and the second location. Compared, for example, to a generally continuous conveyor belt, e.g. having vanes or other crossbars along its length, adapted to bring the waste objects from the first location to the second location, an independently operable carrier has the advantage that a much smaller surface area of the carrier arrangement may come into contact with the waste objects. Thus, a smaller surface area is at risk of becoming soiled by any residual liquids present in the waste objects. It may then be easier to keep the carrier arrangement clean. Furthermore, with an independently operable carrier, it is easier to avoid splashing residual liquids on moving parts of the system, making the system more robust and easier to maintain.

According to an embodiment, the buffer arrangement is adapted to receive the waste object from the container return system/the RVM irrespective of a location of the carrier.

The buffer arrangement may thus be adapted to receive a waste object from the container return system when the carrier is en route from the first location to the second location, or vice-versa, or when the carrier is at the second location, delivering a previously received waste object. In particular, it also means that the buffer arrangement may be adapted to receive a waste object from the container return system concurrently with the carrier being in the first location, while the buffer arrangement may be delivering a waste object to the carrier arrangement.

According to an embodiment, the condition of the buffer arrangement or the orientation of a buffer surface of the buffer arrangement is determined or controlled by the location of the carrier.

According to an embodiment, the buffer arrangement comprises a pivotable buffer surface, the orientation of which is controlled by interaction with the carrier arrangement.

According to an embodiment, the condition or orientation of a pivotable buffer surface of the buffer arrangement is controlled, by mechanical means and/or by sensor means, based on the location of the at least one carrier. This ensures that the buffer arrangement is in the appropriate condition for each location of the carrier; and/or that a buffer surface of the buffer arrangement has the appropriate orientation for each location of the carrier.

According to an embodiment, the buffer arrangement is configured to be in the second condition of the buffer arrangement if the carrier is in the first location of the carrier; and/or that a buffer surface of the buffer arrangement is configured to be in a delivering orientation if the carrier is in the first location of the carrier This ensures that any waste object contained in the buffer arrangement is delivered to the carrier every time the carrier is in or at the first location and may provide a speedier stream of material through the system.

According to an embodiment the speed of the carrier may be adapted based on the number, volume and/or weight of waste containers in the buffer area.

According to an embodiment, the buffer arrangement has a buffer receptacle adapted to receive and distribute the waste object, which buffer receptacle is adapted to tilt between a first position, in which the buffer arrangement is in the first condition, and a second position in which the buffer arrangement is in the second condition, preferably about a substantially horizontal axis.

A tilting buffer receptacle may provide for a buffer arrangement that is both simple and compact.

The buffer receptacle and/or the carrier may, respectively, have a volume capacity that is at least sufficient to accommodate a maximum number of objects processed by the container return system during a time required by the carrier to move from the first location to the second location, deliver the content of the carrier, and move back to the first location. This may provide security to the system since waste objects that do not fit in the buffer receptacle or the carrier, may fall onto other parts of the system or onto the floor, potentially getting stuck or otherwise interfering with operation of the system.

According to an embodiment, the at least one carrier and the buffer receptacle are cooperating, such that at least a part of a displacement of the carrier from the second location to the first location of the carrier is adapted to tilt the buffer receptacle from the first condition to the second condition of the buffer arrangement.

The displacement of the carrier and the tilting movement of the buffer receptacle may thus be coordinated. This may ensure, for example, that no waste object risks falling outside of the buffer receptacle or the carrier during a transition from the first condition to the second condition of the buffer receptacle and from the second location to the first location of the carrier, respectively.

According to an embodiment, the at least one carrier, directly or indirectly, abuts the buffer receptacle during at least the part of the displacement to tilt the buffer receptacle from the first condition to the second condition of the buffer arrangement, optionally the buffer receptacle tilts about a substantially horizontal axis, such that the rotational movement of the buffer receptacle, when tilting, occurs in a vertical plane perpendicular to the front of the RVM.

The cooperation between the carrier and the buffer receptacle may thus be achieved mechanically, keeping the complexity of the system low.

According to an embodiment, the substantially horizontal axis is located transversally in relation to the buffer receptacle.

According to an embodiment, the system further comprises a guide member adapted to guide the waste object from the container return system/the RVM to the buffer receptacle, wherein the guide member preferably is displaceable such that the guide member is adapted to guide the waste object from the container return system/the RVM to the buffer receptacle irrespective of the position of the buffer receptacle.

The guide member may thus ensure that no waste object from the container return system/the RVM falls outside of the buffer arrangement, potentially getting stuck or otherwise interfering with operation of the system.

According to an embodiment, the buffer arrangement is coupled or mechanically attached to the container return system and optionally enclosed in a continuous or discontinuous housing.

This may provide a secure path for the waste object from the container return system to the buffer arrangement.

According to an embodiment, the system further comprises a silo arrangement having at least one silo, wherein each silo comprises:

a mouth at a vertically seen upper end, adapted to receive a waste object;

a waste object chamber; and a hatch at the lowermost end of the waste object chamber, adapted to release and deliver the waste object for storage or further transport, wherein the silo arrangement has a delivering condition, in which the hatch is generally open, and a buffering condition, in which the hatch is generally closed for buffering the waste objects for delivery at a later point in time.

Such a silo arrangement may allow for the space available in a typical container return system backroom to be much more efficiently used. It may allow for more storage capacity on a smaller footprint. It may further allow for continuous operation of the container return system. When in the buffering condition, the silo arrangement can cut off a stream of material from the container return system to, for example, a storage bin, and allow the bin to be changed or emptied without interfering in the operation of the container return system. In particular, continuous operation may be possible without needing to reroute or divert the stream of waste objects whenever a storage bin is full, as is the case in some existing solutions. Such rerouting requires complex systems. The present disclosure thus provides a simpler and more robust solution, which may result in cost savings.

According to an embodiment, the hatch is sized and configured to allow the waste object within the waste object chamber to be released and delivered for storage or further transport.

This may ensure that waste objects do not get entangled with each other and stuck in or around the hatch, preventing the waste objects to be released and delivered.

According to an embodiment, the system further comprises a storage bin, wherein the silo arrangement comprises a stand onto which the silo is arranged, in order for the storage bin to be positionable vertically underneath the silo.

With a storage bin positionable underneath the silo, the system may take advantage of the available vertical space.

According to an embodiment, the stand is provided with support uprights to maintain the silo at a distance from a ground on which the silo arrangement is located.

Support uprights may provide a flexible way to arrange the stand.

According to an embodiment, the stand is provided with four (4) support uprights, wherein the silo has a generally rectangular cross-section, whereby each one of the four support uprights is located generally at a corner of the generally rectangular cross-section of the silo.

A generally rectangular cross-section may maximize the capacity of the silo for a given foot-print. Arranging the support uprights at the corners may allow for easy access to the silo.

According to an embodiment, a distance between at least one set of two adjacent support uprights is adapted to accommodate the storage bin there between.

The system may thus accommodate the silo and the storage bin within the same foot-print.

According to an embodiment, each support upright has a height which is adapted to accommodate the storage bin underneath the silo in use of the silo arrangement.

This ensures that the storage bin does not prevent operation of the silo arrangement by blocking the opening or closing of the hatch.

A silo arrangement according to the present disclosure may be tailored to fit specific needs. It is particularly advantageous that the silo arrangement may be adapted, for example in terms of its dimensions, such as width, length of the silo, and the height of a stand onto which it is arranged, to accommodate any storage bin or waste container, such as ones having standardized sizes and volumes, according to particular local standards for waste or recycling collection.

Using a standard storage bin, as is enabled by the present disclosure, that can be directly emptied in a waste collection truck may further avoid the use of plastic bags and may thus provide environmental as well as cost benefits.

According to an embodiment, the system comprises at least two silos stacked on top of each other, wherein the stack of silos is arranged such that the uppermost silo is adapted to receive the waste object from the carrier arrangement, and adapted to release and deliver the waste object to the silo located vertically seen underneath the uppermost silo, and the bottommost silo is adapted to release and deliver the waste object to the storage bin placed vertically seen underneath the bottommost silo.

This is an efficient way to improve the capacity of the silo arrangement, without increasing its foot-print. Large buffering or storage volumes can be achieved even where the available space is limited, which can be an important advantage in terms of costs where floor space is especially valuable, e.g. in a supermarket.

According to an embodiment, the hatch has a plurality of hatch sections, each hatch section being pivotable about a respective pivot axis and each pivot axis being mutually substantially parallel.

This provides the silo with a large opening, in the delivering condition of the silo, with limited space requirement for opening and closing the hatch, switching between the buffering and the delivering condition of the silo.

According to an embodiment, the hatch sections may be pivotable about a common axis instead of respective, mutually parallel pivot axes. This may allow for simpler construction and installation of the hatch.

According to an embodiment, the hatch has three hatch sections, the hatch sections in the open position being arranged in a generally similar pivotal position, whereby the hatch sections generally overlap one another, and the hatch sections in the closed position being arranged generally adjacent one another.

This configuration may provide an optimal trade-off between complexity and the achievable size of the opening within given space requirements.

According to an embodiment, the hatch sections at least along sides of each hatch section which, in the closed position of the hatch, are located mutually adjacent, have latchings to interconnect mutually adjacent hatch sections.

Only one of the hatch sections thus needs to be driven in order to pivot, the other sections then following thanks to the interconnection.

According to an embodiment, a volume capacity of each silo of the silo arrangement is equal to or lower than a volume capacity of a storage bin positioned underneath the silo arrangement.

Providing a silo and a storage bin with the respective volume capacity mentioned above ensures that, provided that the storage bin is empty, a silo can always be fully emptied into the bin, without having to check the volume of waste objects carried by the silo or having to oversee the opening of the silo and close it before the storage bin overflows. This further automates the handling of the silo arrangement and therefore the required manual labor required is both minimized, lowering costs, and the risk for incorrect handling is reduced.

According to an embodiment, the system further comprises at least one liquid nozzle adapted to deliver a cleaning liquid, such as water, into at least one component of the system chosen from the group of the buffer arrangement, the carrier arrangement and the silo arrangement, for cleaning of the system and/or of the waste object.

Used beverage containers typically contain some amount of residual liquid, which is likely at least to some degree to splash onto the surfaces of the buffer, carrier, and silo arrangements during operation of the system. This is particularly true if a bottle or can has been crushed or compacted prior to being delivered to the buffer arrangement, as the residual liquid may then more easily come out of the container. The residual liquid can leave a sticky residue on the surfaces of the silo arrangement, particularly in the case of used soda bottles and cans, due to the high sugar content. If unattended, this can lead to malfunctioning of the apparatus, as well as create an unpleasant smell. Providing the system with a nozzle for spraying or otherwise delivering a cleaning liquid may rinse the impacted surfaces and avoid some of these problems.

According to an embodiment, the system further comprises a control unit for automatic controlling or scheduling of the cleaning of the system and/or of the waste object.

For example, the cleaning may be automated by assigning a certain interval between instances of delivery of cleaning liquid by the liquid nozzle, in terms of time and/or in terms of a quantity of waste objects delivered to the buffer arrangement, the carrier arrangement and/or the silo arrangement. This may reduce the labor required for controlling the operation of the system and for its maintenance, reducing costs.

According to an embodiment, the buffer arrangement, the carrier arrangement and/or the silo arrangement are adapted to collect, carry and deliver liquids concurrently with the waste object.

It is particularly advantageous for the system to be able to carry liquids, both residual liquids from the waste objects and cleaning liquids, throughout the system. This may provide a cleaner surrounding of the system since the liquids are not dispersed on the floor of the backroom, for example. The system may be installed even where a drain in the floor is missing. The maintenance of the system required may be reduced.

According to an embodiment, the buffer receptacle, the at least one carrier and the silo, when in the buffering condition of the silo arrangement, are drip tight in order to collect, carry and deliver liquids concurrently with the waste object.

In the context of this application, drip tight means that the respective part is able to withstand and carry at least some amount of liquid, without being entirely liquid tight. This may avoid damage on the system in case, for example, of a malfunction of the liquid nozzle.

The RVM comprises and the container return system may comprise means for devaluation of the waste object.

Such means ensures that the waste objects cannot be fed into the container return system again.

According to an embodiment of the first aspect the means for devaluation of the waste object is located upstream of the buffer arrangement, such that waste object is devaluated before being received by the buffer arrangement.

This location reduces the distance travelled by the waste object that needs to be controlled in order to prevent fraud.

According to an embodiment, the container return system/the RVM and the means for devaluation of the waste object, preferably only the container return system/the RVM and the means for devaluation of the waste object, are provided with a fraud-proof housing. In other words, the system downstream of the compactor may be free of a housing, or may have an easily accessible housing and/or may be free of sensors for tracking the positions each singular waste object.

When the means for devaluation is arranged up-stream of the carrier arrangement, the amount of fraud-proof housing may be reduced, leading to cost savings. The rest of the system may also be more easily accessible for maintenance.

According to a third aspect of the disclosure, there is provided a process of transporting and collecting waste objects by a system for collecting waste objects for recycling, such as deposit-return objects, the system comprising a container return system for example an RVM, a buffer arrangement and a carrier arrangement, wherein the process comprises the steps of:

- receiving, by the buffer arrangement a waste object from the container return system;
- buffering the waste object by the buffer arrangement until the carrier arrangement is positioned to receive the waste object, which carrier arrangement is enabled to be operable independently from the container return system;
- delivering the waste object from the buffer arrangement to the carrier arrangement at a first location having a first elevation; and
- transporting and delivering the waste object by the carrier arrangement to a second location having a second elevation, the second elevation vertically seen higher than the first elevation.

The process according to the third aspect may suitably be carried out with a system for collecting waste objects for recycling as described in connection with the first aspect of the disclosure. It should be understood that any features and embodiments of the first aspect of the inventive concept may, as far as it is compatible with the process, be implemented in the process according to the third aspect of the disclosure.

Thus, according to at least one example embodiment, the process of transporting and collecting waste objects according to the third aspect comprises transporting and collecting waste objects by a system for collecting waste objects for recycling in accordance with any embodiment of the first aspect of the disclosure.

According to a fourth aspect of the disclosure, there is provided a process of transporting and collecting waste objects by a system for collecting waste objects for recycling, said waste objects being deposit-return objects, the system comprising a reverse vending machine, RVM, a buffer arrangement and a carrier arrangement, which carrier arrangement comprises at least one carrier adapted to move repeatedly between a first location having a first elevation and a second location having a second elevation which is vertically seen higher than the first elevation and higher than said outlet of the RVM, wherein the process comprises the steps of:

- receiving, by the buffer arrangement, a devaluated waste object from the RVM;
- buffering the devaluated waste object by the buffer arrangement until the carrier arrangement is positioned to receive the waste object,
- delivering the devaluated waste object from the buffer arrangement to the carrier arrangement at the first location; and
- transporting and delivering the devaluated waste object by the carrier arrangement to the second location.

The process according to the fourth aspect may suitably be carried out with a system for collecting waste objects for recycling as described in connection with the second aspect of the disclosure. It should be understood that any features and embodiments of the first and second aspect of the disclosure may, as far as it is compatible with the process, be implemented in the process according to the fourth aspect of the disclosure.

Thus, according to at least one example embodiment, the process of transporting and collecting waste objects according to the fourth aspect comprises transporting and collecting waste objects by a system for collecting waste objects for recycling in accordance with any embodiment of the second aspect of the disclosure.

In the following, some embodiments and further advantages in relation to the third and fourth aspects of the disclosure will be discussed. Unless otherwise stated and as far as they are compatible, the embodiments and advantages apply to both the third and fourth aspect of the disclosure.

According to an embodiment of the fourth aspect, the step of transporting and delivering the devaluated waste object by the carrier arrangement to the second location comprises transporting the devaluated waste object by the at least one carrier in a substantially vertical displacement between the first location and the second location.

According to an embodiment, the step of buffering the waste object by the buffer arrangement is performed until the carrier arrangement is located in the first location, and the step of delivering the waste object from the buffer arrangement to the carrier arrangement is performed concurrently with the carrier arrangement being located in the first location.

This may ensure that the buffer arrangement only delivers the waste object to the carrier arrangement when the carrier arrangement is ready to receive it.

According to an embodiment, the process further comprises the step of selectively delivering the waste object to the buffer arrangement, or to an additional buffer arrangement adapted to deliver the waste object to an additional carrier arrangement.

This allows for a flexible configuration of the system for collecting waste objects. For example, an additional buffer arrangement and carrier arrangement may allow for a greater capacity of the system. It may also allow the system to accommodate waste objects of different materials and/or sizes, in cases where e.g. local standards and regulation do not allow for mixing of different materials for recycling collection.

According to an embodiment, the process further comprises the step of delivering the waste object from the carrier arrangement at the second location to a silo arrangement.

The waste object is delivered to the higher location in order to take advantage of available vertical space.

According to an embodiment of the third aspect, the process further comprises the step of independently operating a carrier of the carrier arrangement to move the carrier between the first location and the second location.

This step may thus be performed independently of e.g. operation of the container return system. Operating a carrier may reduce the surface area that is at risk of becoming soiled by any residual liquids present in the waste objects. It may then be easier to keep the carrier arrangement and other parts of the system clean, making the system more robust and easier to maintain.

According to an embodiment of the third aspect, the process further comprises the step of, during at least a part of a displacement of the carrier from the second location to the first location, abutting directly or indirectly, by the carrier, a buffer receptacle of the buffer arrangement in order to move the buffer arrangement from a buffering condition to a delivering condition of the buffer arrangement.

According to an embodiment of the fourth aspect, the process further comprises the step of, during at least a part of a displacement of the at least one carrier from the second location to the first location, abutting directly or indirectly, by the at least one carrier, a buffer receptacle of the buffer arrangement in order to move the buffer arrangement from a buffering condition to a delivering condition of the buffer arrangement.

This step allows the carrier to determine the condition of the buffer arrangement. It may ensure that the buffer arrangement is in the appropriate condition for each location of the carrier. It may also prevent accidentally delivering the waste object from the buffer arrangement at a time when the carrier is not ready to receive it.

According to an embodiment, the process further comprises the step of delivering a cleaning liquid, such as water, by at least one liquid nozzle into at least one component of the system chosen from the group of the buffer arrangement, the carrier arrangement and the silo arrangement.

If any residual liquid from the waste objects has splashed onto a surface of the components of the system, this step may ensure that it is rinsed off before forming a sticky residue. In so doing, potential malfunctions and unpleasant smells may be avoided. The need for maintenance may be reduced, and the working environment may be improved.

According to an embodiment, the process further comprises the steps of:

- collecting, carrying, and delivering, by a component of the system chosen from the group of the buffer arrangement, the carrier arrangement and the silo arrangement, a liquid originating from residual liquid contained in the waste object, or a cleaning liquid delivered into the buffer arrangement, the carrier arrangement or the silo arrangement.

These steps allow for the management of liquids throughout the system. They may for example ensure that the liquids can be collected by the storage bin and safely disposed of from there.

According to an embodiment, the process further comprises the step of switching between a first condition and a second condition of the silo arrangement, in which first condition the silo arrangement releases and delivers the waste object for storage or further transport, and in which second condition the silo arrangement buffers the waste object therein, to be released and delivered at a later point in time.

Hence, the silo arrangement may be used to either cut off a stream of material or let material through, as needed. Possibly, this step may be performed concurrently with the step of delivering the waste object from the carrier arrangement at the second location to a silo arrangement. Thus, the operation of the system, and in particular of the container return system, need not be interrupted.

According to an embodiment, the process further comprises the step of delivering the waste object from the silo arrangement to a storage bin located vertically under the silo arrangement.

The storage bin may preferably be of a standard size and volume according to local standards for waste or recycling collection. The waste objects may then be easily handled for pick-up by e.g. a recycling collection truck.

According to an embodiment, the process further comprises the steps of:

- switching the silo arrangement from the first condition to the second condition;
- removing the storage bin for emptying or further transport; and
- placing the emptied storage bin or another empty storage bin underneath the silo arrangement.

This step allows for easy emptying of the waste objects from the system and can be performed while maintaining operation of the container return system. The content of the storage bin may be transferred to another container, or may advantageously be directly emptied into a recycling collection truck for transport to a recycling center.

According to an embodiment of the third aspect, the steps of the process is preceded by a step of devaluating the waste object. This ensures that the waste objects cannot be fed into the container return system again, preventing potential fraud.

According to a fifth aspect of the disclosure, there is provided a system for collecting waste objects for recycling, said waste objects being deposit-return objects, comprising a carrier arrangement located to receive a devaluated waste object from an RVM at a first location having a first elevation, and adapted to transport and deliver the devaluated waste object to a second location for storage or further transport, the second location having a second elevation which is vertically seen higher than the first elevation.

The system further comprises a buffer arrangement located to receive the devaluated waste object directly from an outlet of the RVM at a third location having a third elevation different from the first and second elevations, and to deliver the devaluated waste object to the carrier arrangement at the first location.

The carrier arrangement comprises at least one carrier adapted to move repeatedly between the first location and the second location.

The second elevation is higher than said outlet of the RVM.

According to a sixth aspect of the invention, there is provided a silo arrangement, for container return system backrooms, adapted to directly or indirectly receive waste objects, such as deposit-return objects, from a container return system and to deliver the waste objects for storage or further transport, comprising at least one silo, wherein the silo comprises:

- a mouth at a vertically seen upper end, adapted to receive a waste object;
- a waste chamber; and
- a hatch at the lowermost end of the waste object chamber, adapted to release and deliver the waste object for storage or further transport,
- wherein the silo arrangement has a delivering condition, in which the hatch is generally open, and a buffering condition, in which the hatch is generally closed for buffering the waste objects for delivery at a later point in time.

The present disclosure is based on the realization that the space in a typical container return system backroom can be much more efficiently used. A silo arrangement as described above, may allow for more storage capacity on a smaller footprint. The disclosure is also based on the realization that the buffering capability of such a silo arrangement may allow for continuous operation of a container return system. When in the buffering condition, the silo arrangement can cut off a stream of material from a container return system to, for example, a storage bin, and allow the bin to be changed or emptied without interfering in the operation of the container return system. In particular, continuous operation is possible without needing to reroute or divert the stream of waste objects whenever a storage bin is full, as is the case in some existing solutions. Such rerouting requires complex systems. The present disclosure thus provides a simpler and more robust solution, which may result in cost savings.

According to one embodiment, the silo arrangement comprises a stand onto which the silo is arranged, in order for a storage bin to be positionable vertically underneath the silo. The system may thus take advantage of the available vertical space.

According to one embodiment, the stand is provided with support uprights to maintain the silo at a distance from a ground on which the silo arrangement is located. The support uprights may provide a flexible way to arrange the stand.

According to one embodiment, the stand is provided with four (4) support uprights, wherein the silo has a generally rectangular cross section, whereby each one of the four support uprights is located generally at a corner of the generally rectangular cross section of the silo.

A generally rectangular cross-section may maximize the capacity of the silo for a given foot-print. Arranging the support uprights at the corners may allow for easy access to the silo.

According to one embodiment, a distance between at least one set of two adjacent support uprights is adapted to accommodate a storage bin therebetween. The system may thus accommodate the silo and the storage bin within the same foot-print.

According to one embodiment, each support upright has a height which is adapted to accommodate storage bin underneath the silo in use of the silo arrangement. This may ensure that the storage bin does not prevent operation of the silo arrangement by blocking the opening or closing of the hatch.

A silo arrangement according to the present disclosure may be tailored to fit specific needs. It is particularly advantageous that the silo arrangement may be adapted, for example in terms of its dimensions, such as width, length, and the height of a stand onto which it is arranged, to accommodate any storage bin or waste container, such as ones having standardized sizes and volumes, according to particular local standards for waste or recycling collection.

The silo arrangement being usable with standard storage bins has the added advantage that the waste object need not be stored in plastic bags prior to being collected by, for example, a recycling truck. In a typical known container return system installation, non-standard bins or roller cages are used. Such non-standard bins cannot be directly handled by a typical recycling or waste collection truck and are therefore lined with plastic bags. The same is true for roller cages, which require the use of plastic bags to contain the waste objects. Using a standard storage bin, as is enabled by the present disclosure, that can be directly emptied in a waste collection truck thus avoids the use of plastic bags and may provide environmental as well as cost benefits. Further, the known plastic bags can sometimes cause problems in recycling processing centers, where they may get entangled or otherwise prove difficult to sort.

According to one embodiment, the silo arrangement comprises at least two silos stacked on top of each other, wherein the stack of silos is arranged such that the uppermost silo is adapted to receive the waste object, and adapted to release and deliver the waste object to the silo located vertically seen underneath the uppermost silo, and the bottommost silo is adapted to release and deliver the waste object for storage or further transport.

This is an efficient way to improve the capacity of the silo arrangement, without increasing its footprint. Large buffering or storage volumes can be achieved even where the available space is limited, which can be an important advantage in terms of costs where floor space is especially valuable, e.g. in a supermarket.

According to one embodiment, the hatch has a plurality of hatch sections, each hatch section being pivotable about a respective pivot axis between a closed position, in which the silo arrangement is in the buffering condition, and an open position, in which the silo arrangement is in the delivering condition, and each pivot axis being mutually substantially parallel.

This may provide the silo with a large opening, in the delivering condition of the silo, with limited space requirement for opening and closing the hatch, switching between the buffering and the delivering condition of the silo.

In at least some embodiments, the hatch sections may be pivotable about a common axis instead of respective, mutually parallel pivot axes. This may allow for simpler construction and installation of the hatch.

According to one embodiment, the hatch has three hatch sections, the hatch sections in the open position being arranged in a generally similar pivotal position, whereby the hatch sections generally overlap one another, and the hatch sections in the closed position being arranged generally adjacent one another.

This configuration may provide an optimal trade-off between complexity and the achievable size of the opening within the given space requirements.

According to one embodiment, the hatch sections at least along sides of each hatch section which, in the closed position of the hatch, are located mutually adjacent, have latchings to interconnect mutually adjacent hatch sections.

Only one of the hatch sections thus needs to be driven in order to pivot, the other sections then following thanks to the interconnection.

According to one embodiment, the silo arrangement further comprises at least one liquid nozzle adapted to deliver a cleaning liquid, such as water, into the silo for cleaning the silo arrangement and/or the waste object.

Used beverage containers typically contain some amount of residual liquid, which is likely at least to some degree to splash onto the surfaces of the silo arrangement while the containers are delivered to the silo, moving around in the waste chamber, or being delivered through the hatch opening. This is particularly true if a bottle or can has been crushed or compacted prior to being delivered to the silo, as the residual liquid may then more easily come out of the container. Additionally, residual liquid may be delivered to the silo concurrently with the used beverage containers, depending on the system used. The residual liquid can leave a sticky residue on the surfaces of the silo arrangement, particularly in the case of used soda bottles and cans, due to the high sugar content. If unattended, this can lead to malfunctioning of the apparatus, as well as create an unpleasant smell. Providing the silo arrangement with a nozzle for spraying or otherwise delivering a cleaning liquid to the silo arrangement may rinse the impacted surfaces and avoid some of these problems.

According to one embodiment, the hatch is drip tight in the buffering condition.

In other words, the hatch is adapted to withstand at least some amount of liquid, such that the silo arrangement, when in the buffering condition, may carry residual liquid from used beverage containers as well as cleaning liquid delivered to the silo arrangement. It is advantageous for the hatch to not be entirely liquid tight, in order, for example, to avoid filling the silo entirely with cleaning liquid in case of a malfunction of the liquid nozzle, which could lead to damage on the silo arrangement.

According to one embodiment, the at least one liquid nozzle is controllable by a control unit for automatic controlling or scheduling of the cleaning of the silo arrangement and/or the waste object.

For example, the cleaning may be automated by assigning a certain interval between instances of delivery of cleaning liquid by the liquid nozzle, in terms of time and/or in terms of a quantity of waste objects delivered to the buffer arrangement, the carrier arrangement and/or the silo arrangement. This may reduce the labor required for controlling the operation of the system and for its maintenance, reducing costs.

According to one embodiment, the hatch is controllable by a control unit for automatic controlling or scheduling of opening and closing of the hatch.

This allows for the operation of the silo arrangement to be customized according to preference. The hatch may for example be automatically opened when an empty storage bin is placed underneath the silo. Conversely it may be automatically closed when the storage bin is full. Opening and closing of the hatch may be scheduled according to predicted use of the container return system, and coordinated with a schedule of pick-up of the waste objects for recycling.

According to one embodiment, the hatch and the at least one liquid nozzle are controllable by the same control unit.

Cleaning of the silo arrangement by the liquid nozzle may advantageously be coordinated with the opening of the hatch, for example by ensuring that the liquid nozzle delivers some cleaning liquid to the silo arrangement every time the hatch is opened and the silo is emptied of its content.

According to one embodiment, a volume capacity of each silo of the silo arrangement is equal to or lower that a volume capacity of a storage bin positioned underneath the silo arrangement.

Providing a silo and a storage bin with the respective volume capacity mentioned above ensures that, provided that the storage bin is empty, a silo can always be fully emptied into the bin, without having to check the volume of waste objects carried by the silo or having to oversee the opening of the silo and close it before the storage bin overflows. This further automates the handling of the silo arrangement and therefore the required manual labor required is both minimized, lowering costs, and the risk for incorrect handling is reduced.

BRIEF DESCRIPTION OF THE DRAWINGS

The disclosure, some non-limiting embodiments and further advantages of the disclosure will now be further described with reference to the drawings, in which.

DETAILED DESCRIPTION OF EMBODIMENTS

Figure 1:
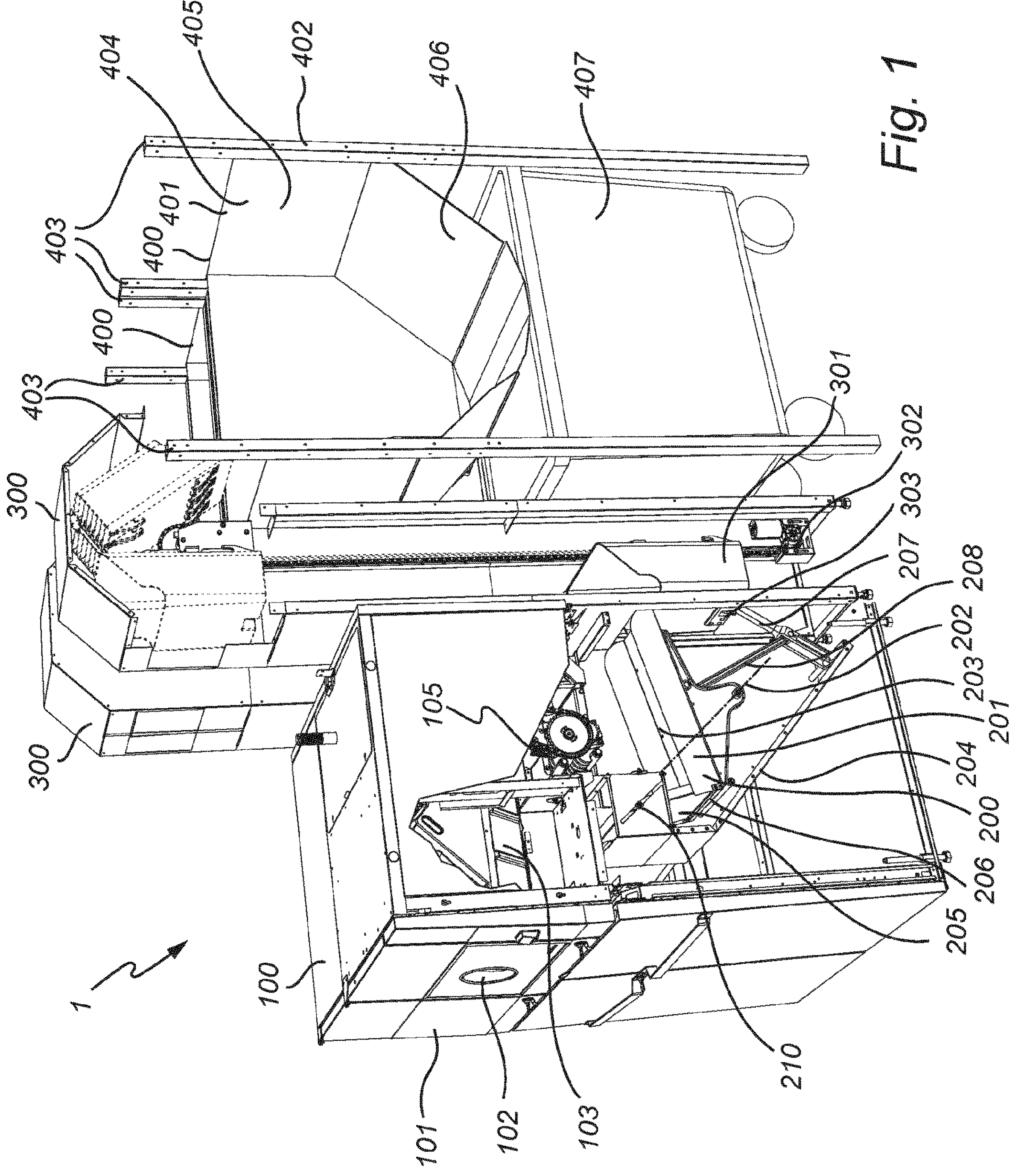
FIG. 1 shows in perspective view an embodiment of a system according to the disclosure, comprising a container return system, two buffer arrangements, two carrier arrangements and two silo arrangements.

FIG. 1 illustrates an embodiment of a system according to an aspect of the present disclosure. The system comprises two silo arrangements 400 according to one embodiment of the sixth aspect of the present disclosure. FIG. 1 shows a system 1 for collecting waste objects 2 (shown in FIG. 2) for recycling, comprising a container return system in the form of a reverse vending machine (RVM) 100, two buffer arrangements 200, two carrier arrangements 300 and two silo arrangements 400. The RVM 100, buffer arrangement 200 and carrier arrangement 300 are shown in FIG. 1 with open sides, with parts of the respective housings removed. A side wall of the silo 401 is removed, to better disclose the inner parts of the silo 401 with the waste object chamber 405 and the hatch 406.

Each set of buffer arrangement 200, carrier arrangement 300 and silo arrangement 400 is adapted to transport and deliver a waste object 2 to a respective storage bin 407. This type of RVM 100 is a typical example for an RVM version which may be used in local shops or markets, in which, typically, used beverage cans or containers (UBC) 2 are returned for recycling or reuse. The return is commonly combined with the return of a small payment of money, a deposit, in order to promote the recycling of the used beverage cans 2 as such, or of the material of which it is made. National laws apply in this regard and not only used beverage cans 2 may be the focus, but many items, such as e.g. batteries, used gas canisters etc. The RVM 100 may in such a case be differently designed, but the general principles of the present disclosure still apply. In an RVM 100 of this type a private person inserts the UBCs 2 into the RVM 100 and the local shop or market is responsible for handling of the monetary side and the distribution and handling of further steps for the returned UBCs 2 and the RVM 100 itself. Oftentimes a nationwide system is regulating the handling in detail and the handling of money and distribution and recycling of the returned UBCs 2 is taken care of by third parties. Since the returned UBCs 2 involve a monetary value, strict handling and safeguarding of a consolidated and intact process is often vital.

The RVM 100 has a housing comprising a front 101, which includes an inlet 102 for feeding the waste objects 2, such as deposit-return objects as discussed above, to the system. The housing of the RVM also comprises a top, a back panel and two side panels. The housing of the RVM encloses means for recognition, validation and sorting 103, a compactor 105 for compacting for example empty beverage cans or bottles, and a glass crusher next to the compactor 105 (not visible in FIG. 1). In order to safeguard the integrity of the system and to ascertain that it may not be tampered with, the housing is fraud-proof. It is enough that the housing covering the RVM 100 from the inlet 102 to the glass crusher and/or the compactor 105 (the system may contain only one of these items as will also be shown further below) is fraud-proof, since after this point any waste object 2 is generally devaluated, at least to the extent of any accompanying deposit money. In case the system is not at all provided with a crusher or compactor and the waste object 2 is left virtually intact through the container return system, then on the other hand, either the whole system or the room or space in which it is placed may be provided with safety measures.

Generally, the public only has access to the front 101 with the inlet 102 of the RVM 100. The front 101 may for example be located in an accordingly designed and constructed hole in a wall of the shop. The wall is not shown in FIG. 1. All other parts of the system are preferably placed on an opposite side of the wall, such that only shop personnel or other staff with access to the room are allowed to enter. Such a room or space is normally called a backroom.

Typical measures of an RVM 100 of this kind is a front 101 of approx. 60-100 cm width and up to 180 cm height. The inlet 102 may be located within reach for the public, and for availability reasons for wheelchair bound persons it may be positioned from 120 cm height from a floor, up to approx. 150 cm height. The length of the RVM 100, from the inlet 101 to an outlet from the glass crusher and/or the compactor 105 may be as short as approx. 60 cm, but may be longer depending on the design and particulars regarding a specific installation. A system of this kind is however very compact and its footprint is small. Sizes of other parts of the system will be discussed further below.

In the present embodiment the system has two sets of buffer arrangements 200, carrier arrangements 300 and silo arrangements 400 together with a respective storage bin 407. The system is adapted to receive two generally different types of waste objects 2, glass bottles on the one hand and aluminium or plastic bottles on the other. When entering the inlet 101 the waste objects 2 are recognised, validated and sorted by the means for recognition, validation and sorting 103. The glass bottles are sorted to be crushed by the glass crusher, and the aluminium or plastic bottles are sorted to be compacted by the compactor 105. This is performed within the RVM 100.

After being crushed, the crushed waste object 2 is falling onto the buffer arrangement 200 arranged for waste glass, and is further distributed and transported through the accompanying carrier assembly 300 and silo 400 to be stored in the storage bin 407, which consequently only will contain crushed glass and any items potentially connected therewith. After being compacted, the compacted waste object 2 is falling onto the buffer arrangement 200 arranged for waste aluminium or plastic objects, and is further distributed and transported through the accompanying carrier assembly 300 and silo 400 to be stored in the storage bin 407, which consequently only will contain compacted aluminium or plastic objects and any items potentially connected therewith. Naturally other material or object combinations for sorting and further handling may apply depending on particular needs. It is noteworthy that in the storage bin 407 which is arranged for collecting aluminium and plastic objects, these are mixed together at this stage. Any further sorting may be performed by other means and at other locations.

Turning back to the RVM 100, the housing of the RVM 100 of FIG. 1 also encloses, at least partially, the buffer arrangements 200. The buffer arrangements 200 are located, within the housing of the RVM 100, underneath the glass crusher and the compactor 105, respectively, such that waste objects 2 having gone through the glass crusher or the compactor 105 falls into the respective buffer arrangement 200 by gravity.

Each buffer arrangement 200 has a buffer receptacle 201 which can tilt between a first position, in which the buffer arrangement 200 is in a first condition, and a second position, in which the buffer arrangement 200 is in a second condition. The buffer receptacle 201 is shown in FIG. 1 in the first position, and the buffer arrangement 200 is thus shown in the first, buffering condition when waste objects 2 is allowed to fall onto the buffer receptacle 201 for buffering, thus for later distribution and transport further through the system.

The buffer receptacle 201 tilts about a horizontal axis 202, such that the rotational movement of the buffer receptacle 201, when tilting, occurs in a vertical plane perpendicular to the front 101 of the RVM 100.

The buffer receptacle 201 has a plate forming a receiving surface 203, and generally vertically extending side walls. Waste objects 2 that are delivered by the RVM 100 to the buffer arrangement 200 are further protected from falling or bouncing outside of the buffer receptacle 200 in the present embodiment by an additional housing 204 partly enclosing the buffer arrangement. This is however not always necessary depending on the overall design of the system.

As can be seen in FIG. 1, when the buffer arrangement 200 is in the first condition and the buffer receptacle 201 is in the first position, the receiving surface 203 of the buffer receptacle 201 is inclined or tilted towards the front 101 of the RVM 100. In this position, the part of the buffer receptacle 201 that is closest to the front 101 of the RVM 100 is lower than the part of the buffer receptacle 201 that is the farthest away from the front 101 of the RVM 100. In this position any waste objects 2 will remain on the receiving surface 203 of the buffer receptacle 201. Conversely, when the buffer arrangement 200 is in the second condition and the buffer receptacle 201 is in the second position, the receiving surface 203 of the buffer receptacle 201 is inclined or tilted towards the rear of the RVM 100. In this position, the part of the buffer receptacle 201 that is the closest to the front 101 of the RVM 100 is higher than the part of the buffer receptacle 201 that is the farthest from the front 101 of the RVM 100. In this position any waste objects 2 will glide or slide off the receiving surface 203 of the buffer receptacle 201.

The buffer arrangement 200 also comprises a guide member 205, which guides waste objects 2 from the RVM 100 to fall into and/or stay in the buffer receptacle 201. The guide member 205 is essentially a rectangular plate, which is attached at one of its edges to the buffer receptacle 201 on the edge of the buffer receptacle closest to the front 101 of the RVM 100, so that it forms a hinging connection 206 with the buffer receptacle 201. The guide member is further preferably connected to the housing 204, with attachments at the two corners of the edge opposite the edge connected to the buffer receptacle 201. The corners are attached to the housing 204 in two lateral, inclined slots 210 of the housing 204. The guide member 205 is thus constrained to rotational movement on the edge connected to the buffer receptacle 201, and to translational and rotational movement on the opposite edge.

When the buffer receptacle 201 is in the buffering position, the guide member acts as a wall, preventing waste objects from falling or sliding down from the buffer receptacle 201, for example between the buffer receptacle 201 and the housing 204. When the buffer receptacle 201 is in the delivering position, the receiving surface 203 of the buffer receptacle 201 is farther back in relation to the RVM 100, because of the rotational movement of the buffer receptacle 201. In this position, the guide member 205 prevents the waste object 2 from falling directly, from the RVM 100, outside of the buffer receptacle 201. Alternatively, the buffer receptacle 201 could be made longer to extend further towards the front 101 of the RVM 100 and if so, the need for a guide member 205 may be reduced or even removed. Other alternative designs are imaginable for a skilled person.

Each carrier arrangement 300 comprises a single carrier 301 in the form of a bucket with a rectangular cross-section. The carrier 301 is shown in FIG. 1 in three different positions along its path between the first location, at the bottom of the carrier arrangement 300, and in the second location, at the top of the carrier arrangement 300, in two different positions. A chain drive 302 extends vertically from the bottom to the top of the carrier arrangement 300, with the carrier 301 attaching to the chain of the chain drive 302 by hooks on the back wall of the carrier. The chain drive 302 can rotate in either direction in order to move the carrier 301 back and forth between the first and the second location. The carrier 301 moves vertically up on the chain drive 302 from the bottom of the carrier arrangement 300 towards the top of the carrier arrangement 300. At the top of the carrier arrangement 300, the carrier 301 follows the rotation of the chain of the chain drive 302 around a top sprocket until it reaches its end position. In the end position, the carrier 301 is inverted and the waste objects 2 slide or fall out of the carrier 301 for further transport and delivery. The chain drive 302 may be exchanged for any type of drive accomplishing a movement between the first and the second location of the carrier arrangement 300. One such alternative is a belt drive. The height of the carrier arrangements 300 is mainly decided by the fact that when the carrier 301 is located in its inverted position to be emptied, the waste object 2 falling out thereof should fall into the silo arrangement 400 to which it is connected.

The size of the buffer receptacle 201 and of the carrier 301, in terms of volume capacity, or the number of UBCs 2 that they can contain, are mainly determined by two factors: the time needed for the carrier 301 to complete a full cycle from the first location, to the second location, and back to the first location, and the number n of UBCs 2 that the RVM 100 can process and deliver to the buffer arrangement 200 during that time. The time needed for the carrier 201 to complete a full cycle depends in turn on the height of the carrier arrangement 300 and the speed at which the carrier 201 moves. To ensure that the buffer receptacle 201 and the carrier 301 do not overflow with UBCs, they are each at least large enough to accommodate n UBCs 2, preferably with a margin.

The buffer arrangement 200 has in the present embodiment a lever 207 which is rotatably attached on one end to a bottom part of the housing 204, and is mechanically linked to the buffer receptacle 201 by an arm 208. The lever 207 has a free end, opposite the end which is rotatably attached to the housing 204. The arm 208 is rotatably attached to the underside of the buffer receptacle 201 on one end and rotatably attached to the lever 207 on the opposite end. The lever 207 and arm 208 are arranged so that operating the lever 207, by pushing down or pulling up its free end, controls the tilting of the buffer receptacle 201. Further, the lever 207 is arranged to be operated by the movement of the carrier 301 up or down. The cooperation of the carrier 301 and the buffer arrangement 200 will be further described in connection with FIG. 3 below.

Each silo arrangement 400 has a silo 401, which in the present embodiment is supported by a separable stand 402. This may be differently designed. The silo 401 has a rectangular cross-section in a horizontal plane. The stand 402 has four support uprights 403, one support upright 403 at each of the four corners of the rectangular silo 401. The stand 402 maintains the silo 401 in position at a distance from the floor such that the storage bin 407 is positionable underneath. The silo 401 has a mouth 404 at the upper end, providing an opening for receiving the UBC 2 into a waste object chamber 405. The silo 401 has a hatch 406 at the lowermost end of the waste object chamber 405. The hatch is shown in FIG. 1 in its closed position. A storage bin 407 is positioned underneath each silo arrangement 400. The storage bin 407 may be of a standard format like in FIG. 1, but may also be particularly designed for use in the system.

Different embodiments of the silo arrangement 400 and the silo 401 will be described in further detail below in connection to FIGS. 6-8.

Figure 2:
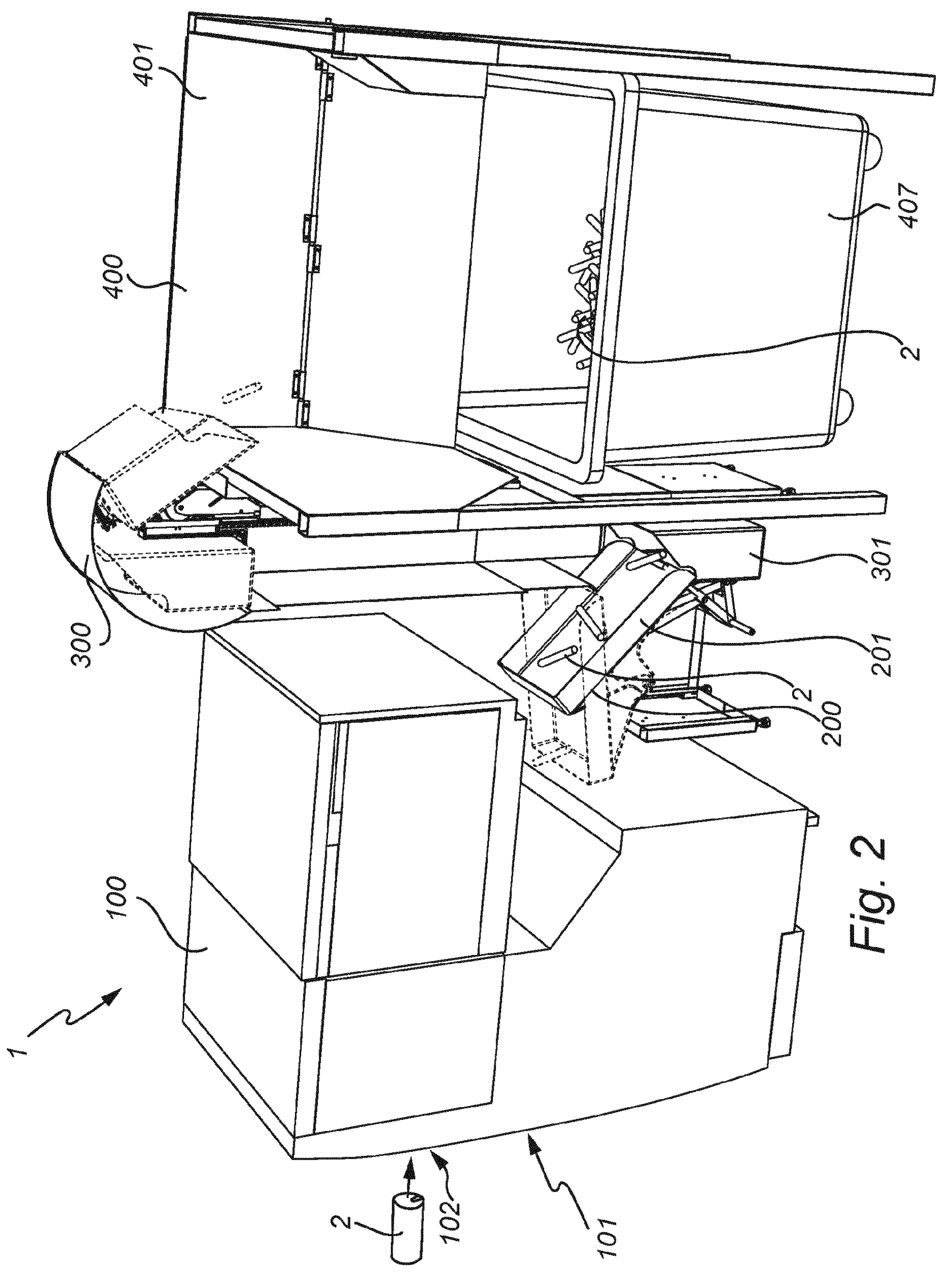
FIG. 2 is an illustration in perspective view of an embodiment of a system according to the disclosure in use, showing a material stream from a user feeding a waste object to the container return system, to the waste object delivered to the silo arrangement, via the buffer arrangement and the carrier arrangement.

FIG. 2 is an illustration in perspective of a system for collecting waste objects for recycling in use. Features of generally similar kind and purpose are given similar numbering in comparison to what is disclosed in FIG. 1. The system shown in FIG. 2 comprises an RVM 100, a single buffer arrangement with a buffer receptacle 201, a single carrier arrangement 300 with a carrier 301, and a silo arrangement 400 with a silo 401. The system according to this embodiment is consequently adapted to be able to sort different objects from each other and to treat the different types of objects differently, but to mix them together again in a single object stream through the single set of buffer arrangement 200, carrier arrangement 300, silo arrangement 400 and storage bin 407. Naturally, the system may be adapted to only receive a single type of waste object 2. For a more detailed description of the RVM 100, the disclosure in relation to FIG. 1 may be consulted.

The buffer receptacle 201 is shown in the delivering position, tilted towards the carrier 301, and compacted UBCs 2 can be seen sliding from the buffer receptacle 201 into the carrier 301. Concurrently, a used beverage container 2 is inserted in the RVM 100 at the inlet 102 on the front 101 of the RVM 100. A number of UBCs 2 can be seen in the storage bin 407, having already been handled, delivered and transported through the system, from inlet 102 of the RVM 100 to the storage bin 407 via the buffer receptacle 201, the carrier 301 and through the silo 401. Here, the hatch 406 of the silo 401 is in an open, or partially open position. The silo 401 is however shown in FIG. 2 with a side wall and a hatch section removed, for clarity of the disclosure.

The buffer receptacle 201 is also shown in dashed lines at a different point in time. Here, the buffer receptacle 201 is in the buffering position, and is shown receiving a UBC 2 from the RVM 100.

The carrier 301 is also shown in different positions in dashed lines: arriving at the top of the carrier arrangement before following the rotation of the chain drive 302, and at its end position, delivering a UBC 2 that is falling into the silo 401.

Figures 3A, 3B, 3C:
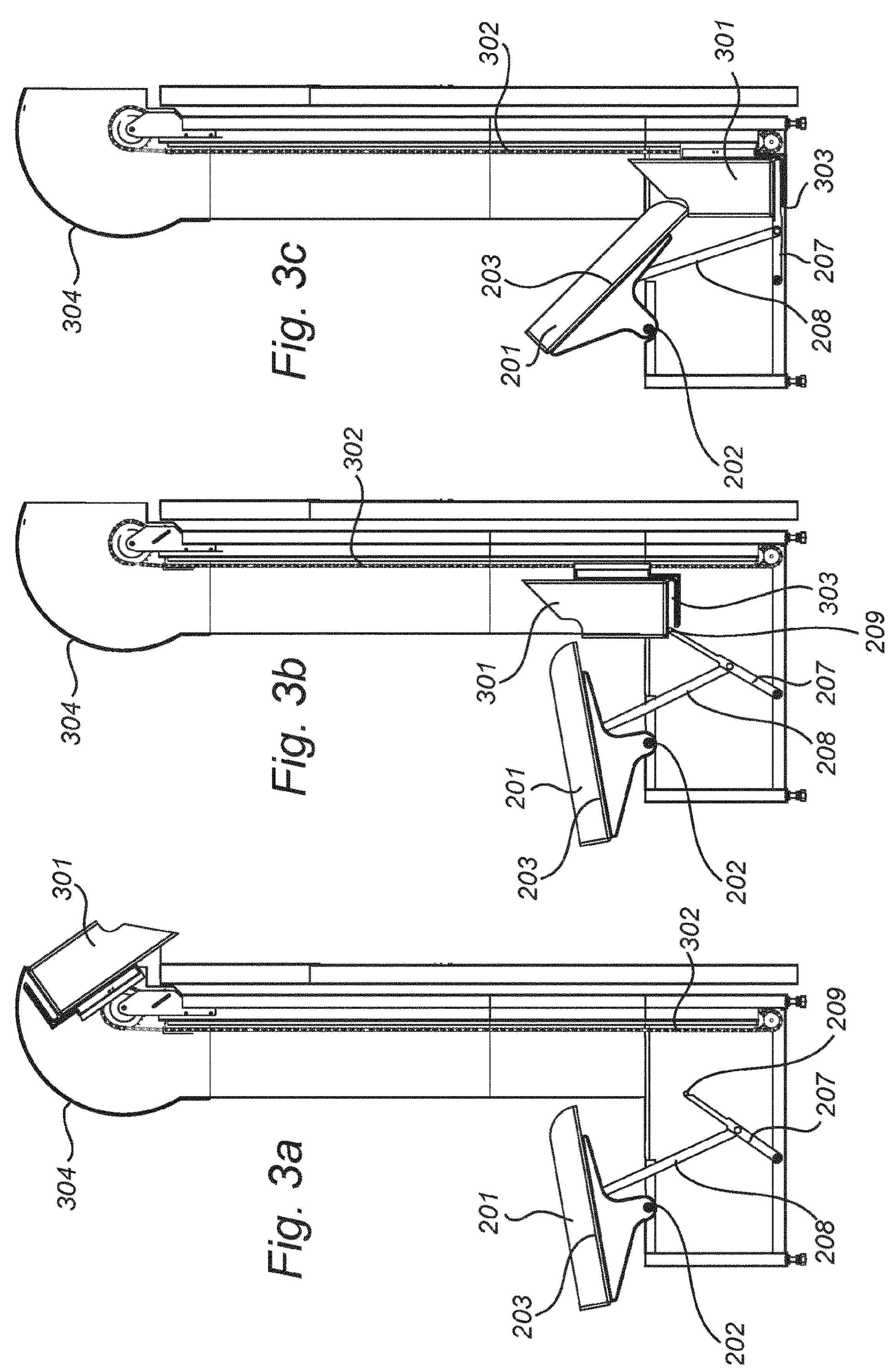
FIGS. 3*a-c* show a side projection of an embodiment of the buffer arrangement and of the carrier arrangement, as well as their interaction in different locations of the carrier.

The cooperation between the carrier 301 and the buffer receptacle 201 is schematically illustrated in FIGS. 3*a-c*. FIG. 3*a* shows the carrier 301 at the second location, in position to deliver a waste object 2 to the silo arrangement 400. The buffer receptacle 201 is in the first position, tilted towards the front 101 of the system 1, the buffer arrangement 200 being in the buffering condition. In FIG. 3*b*, the carrier 301 has moved down the carrier arrangement 300, driven by the chain drive 302, toward the first location at the bottom of the carrier arrangement 300. In the position shown in FIG. 3*b*, the underside of the carrier 301 comes into contact with the free end of the lever 207. The carrier 301 has a groove 303 on its underside which accommodates part of the lever 207 during a portion of the displacement of the carrier 301. The surfaces of the groove act as cam surfaces, pushing down or pulling up on the lever 207, depending on the direction of displacement of the carrier 301. The free end of the lever 207 is provided with wheels 209 to facilitate the movement of the lever 207 in the groove 303. In FIG. 3*c*, the carrier 301 has reached the first location, at the bottom of the carrier arrangement 300. The lever 207 is pushed down, resulting in a pulling action of the arm 208 on the buffer receptacle 201, tilting the buffer receptacle 201 to put the buffer arrangement 200 in the second, delivering condition. Hereby the buffer arrangement 200 enables the container return system and the carrier arrangement 300 to be operable independently from one another, and the buffer arrangement 200 is adapted to deliver the waste object 2 to the carrier arrangement 300 concurrently with the carrier arrangement 300 being located in the first location.

In the illustrated embodiment of FIGS. 3*a-c*, the carrier assembly 300 is provided with a housing 304, but this is not necessary.

Figures 4A, 4B:
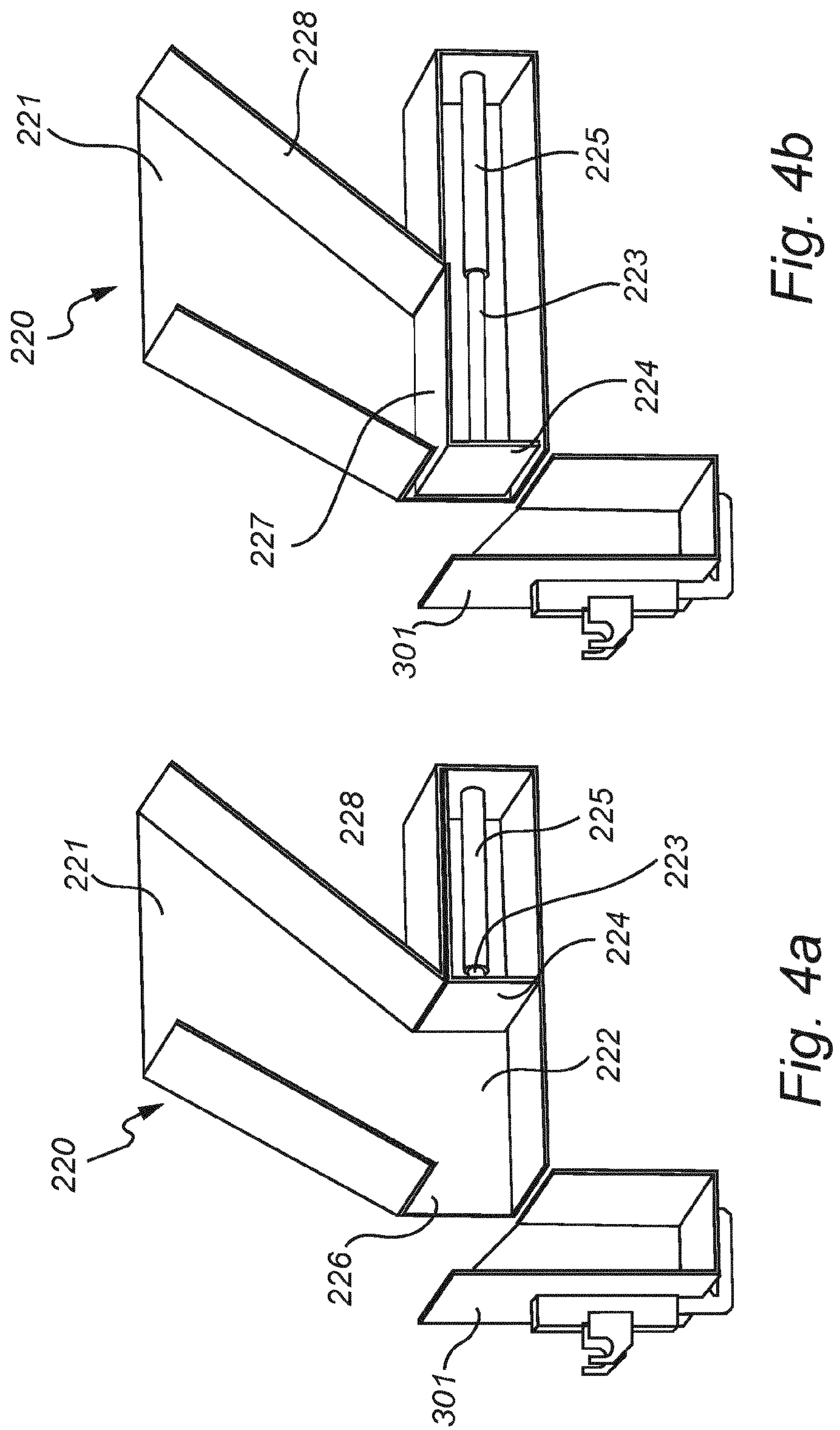
FIGS. 4*a* & 4*b* show in perspective view an alternative embodiment of the buffer arrangement.

An alternative embodiment of the buffer arrangement 220 is shown in FIGS. 4*a* and 4*b*, in which FIG. 4*a* is illustrating the buffer arrangement 220 in the buffering condition and FIG. 4*b* illustrating the buffer arrangement in the delivering condition. The carrier 301 is of already disclosed embodiment, although parts which do not add to the disclosure of the buffer arrangement 220 are removed for simplification. The waste object 2 is received in a chute 221 which is opened at an upper end of the buffer arrangement 220, facing the outlet of the RVM 100. When the buffer arrangement 220 is in the buffering condition, the chute 221 guides the waste object to a buffer zone 222 located at the bottom of the chute 221. The buffer arrangement 220 has a pushing mechanism 223, with a push paddle 224 and linear guides 225 to produce a displacement of the push paddle 224. When the pushing mechanism 223 is retracted, the push paddle 224 forms a rear wall of the buffer zone 222, extending the width of the buffer zone 222.

As seen in FIG. 4*b*, when the buffer arrangement 220 is in the delivering condition, the push paddle 224 moves forward. The push paddle 224 thus pushes any waste object 2 located in the buffer zone 222 forwards toward a front opening 226 where the waste object 2 is delivered to the carrier 301 of the carrier arrangement 300. In its most expanded position, the push paddle 224 of the pushing mechanism 223 covers the front opening 226 and the buffer zone 222 is entirely occupied by the pushing mechanism 223. The linear guides 225 of the pushing mechanism 223 are covered such that the pushing mechanism 223 provides a receiving surface 227 for a waste object 2 when the pushing mechanism 223 is in any position other than its retracted position.

As the pushing mechanism 223 returns to its retracted position from its expanded position, any waste object 2 on the receiving surface 227 is scraped off the receiving surface 227 by the rear wall 228 of the chute 221. The waste object 2 thus falls into the buffer zone 222. The buffer arrangement 220 can thus receive waste objects 2 from a container return system at any time.

Figure 5:
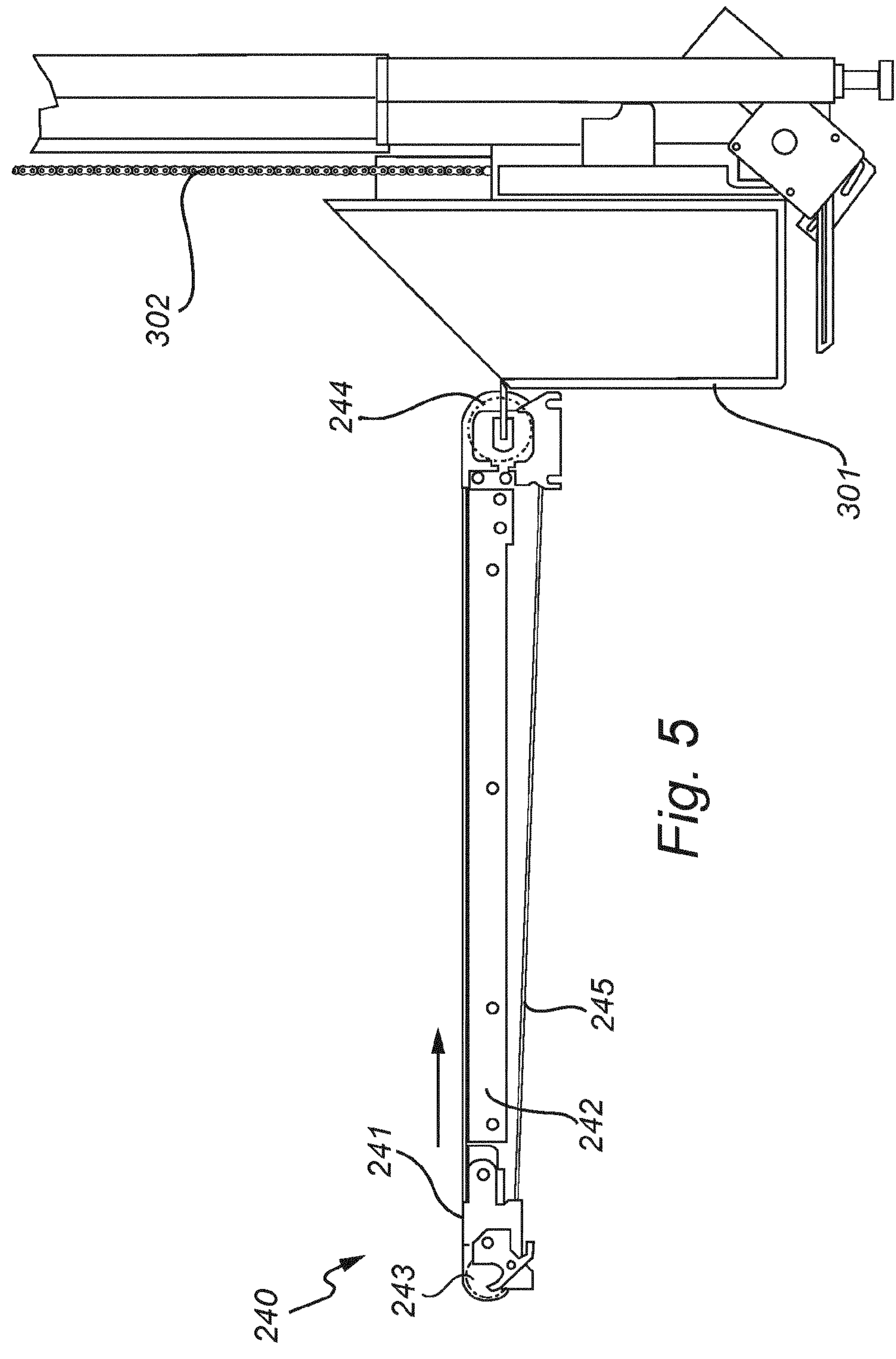
FIG. 5 shows in side projection a further alternative embodiment of the buffer arrangement.

A further alternative embodiment of a buffer arrangement 200 is shown in side projection in FIG. 5. This buffer arrangement 240 is a horizontal belt conveyor 241 having a frame 242, rollers 243, 244 at either end of the frame, and a conveyor belt 245 looped around the rollers 243, 244. The belt conveyor 241 is arranged so that it can receive a waste object (not shown in FIG. 5) at one end of the belt conveyor 241. The other end of the belt conveyor 241 is positioned so that a waste object which is buffered or transported on the belt conveyor 241 falls into the carrier 301 of the carrier arrangement 300 when the carrier 301 is in the first position. In this embodiment, the rotation of the conveyor belt 245 around the rollers 243, 244 is controlled so that a waste object only reaches the end of the belt conveyor 241 if the carrier 301 is ready to receive the waste object and thus located in the first position. At all other times the belt conveyor 241 is hindering the waste objects to reach the first position of the carrier 301 and the belt conveyor is consequently in a buffer condition buffering the waste objects for later delivery.

Figures 6A, 6B:
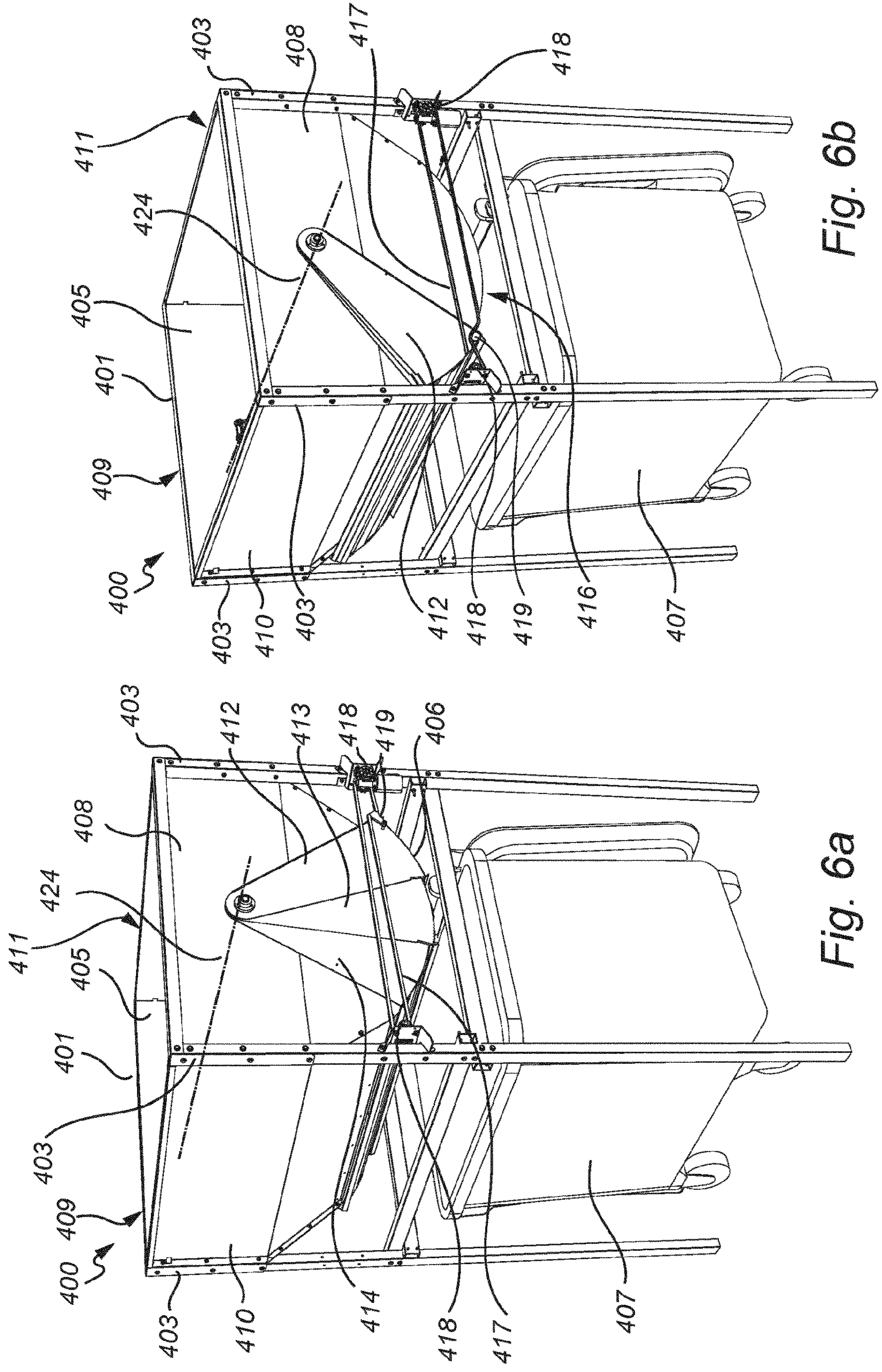
FIGS. 6*a* & 6*b* show in perspective view an embodiment of the silo arrangement, with the hatch in a closed position and in an open position, respectively.

FIGS. 6*a* and 6*b* show an embodiment of the silo arrangement 400 with the hatch 406 in a closed position and in an open position, respectively.

The waste object chamber 405 is defined by four vertical walls 408, 409, 410, 411, each wall extending horizontally between two of the support uprights 403 and extending vertically along the same two support uprights 403. Two side walls 408, 409 extend vertically the height of the silo 401, with a generally rounded bottom edge. The front wall 410 and the rear wall 411 extend vertically from the top of the silo 401 to approximately half the height of the silo 401, where the rounding of the side walls 408, 409 starts. The front wall 410 and the rear wall 411 then further extend at an angle toward the centre of the silo 401, following the rounding of the side walls 408, 409, leaving an opening 416 between the front and rear walls 410, 411 at the bottommost end of the silo 401. In the open position of the hatch 406 any and all waste objects 2 within the silo 401 are able to fall out of the silo 401, with the intention to fall into storage bin 407 which is supposed to stand underneath the silo 401 between the four support uprights 403. It is consequently preferable that the hatch 406 is designed such that it does not interfere with any such storage bin space underneath the silo 401.

At least two adjacent support uprights 403, and preferably all support uprights 403 are located at a distance from one another, such that the storage bin 407 may be driven in and out of the space underneath the silo 401.

A horizontal axle (not shown in FIGS. 6*a* and 6*b*) extends between the two side walls 408, 409, along an axis 424. The axle is connected to the respective side walls 408, 409 at equal distance from the two support uprights 403, the vertical distance between the axle and the bottom of the side walls 408, 409 corresponding to the radius of the rounding of the bottom edge of the side walls 408, 409.

The hatch 406 of the silo 401 is formed by three hatch sections 412, 413, 414. Each hatch section 412, 413, 414 is pivotably connected to the axle on the outside of the two side walls 408, 409. In the closed position of the hatch 406 shown in FIG. 6*a*, the hatch sections 412 are positioned adjacent to one another, so as to cover the opening 416. In the open position of the hatch 406, shown in FIG. 6*b*, the hatch sections 412, 413, 414 are positioned adjacent to the front wall 410 and are overlapping each other, leaving the opening 416 accessible. Each hatch section 412, 413, 414 is interconnected along respective adjacent side edges. Each interconnection is achieved through a bent part of the side edge of the hatch section 412, 413, 414, such that a 90 degree protrusion or rim is created. Thereby the adjacently located protrusions abut and provide the interconnection in question.

The movement of the hatch sections 412, 413, 414 between the closed and the open position of the hatch 406 is driven by a belt drive mechanism. This may also be a chain drive or other means as desired. The belt 417 loops between two sprockets 418 each mounted on a support upright 403 on a side of the side wall 408. The belt 417 is attached to the outermost hatch section 412 by an attachment 419 so that when the belt 417 rotates, it drives the hatch section 412 to pivot about the axis 424. The hatch sections 412, 413, 414 have latchings to interconnect mutually adjacent hatch sections. The outermost hatch section 412 which is driven by the belt 417 thus in turn drives the middle hatch section 413, which in turn drives the third hatch section 414. The hatch 406 may also be opened partially through the belt drive mechanism in order to only partially empty the waste objects 2 from the silo 401.

The hatch sections 412, 413, 414 could alternatively be mounted closer to the bottom of the side walls 408, 409, instead of being connected to the axle. With an appropriate mounting, the hatch section 412, 413, 414 could still have essentially the same rotational movement about the axis 424, using the same belt 417 drive mechanism. The hatch 406 could also have both more or fewer hatch sections as desired.

Figures 7A, 7B:
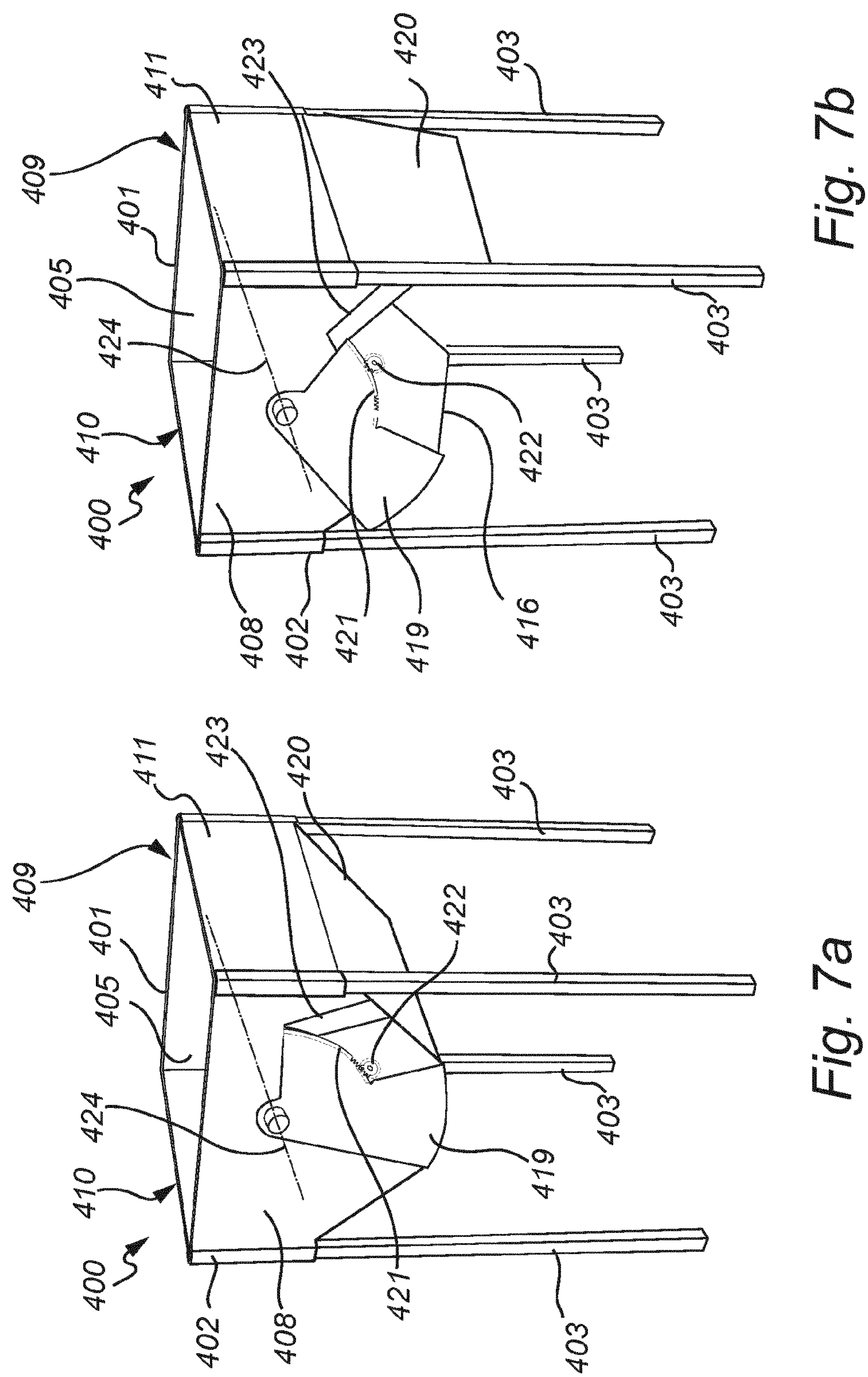
FIGS. 7*a* & 7*b* show in perspective view the silo arrangement with an alternative embodiment of the hatch in a closed position and in an open position, respectively.

An alternative embodiment of the hatch 406 of the silo 401 is shown in FIGS. 7*a* and 7*b* in a closed position and in an open position of the hatch 406, respectively.

The waste object chamber 405 is defined by the four vertical walls 408, 409, 410, 411, each wall extending horizontally between two of the support uprights 403 and extending vertically along the same two support uprights 403. The two side walls 408, 409 extend vertically the height of the silo 401, with the lower half of the side wall 408, 409 being chamfered on the two lower corners. The front wall 410 and the rear wall 411 extend vertically from the top of the silo 401 to approximately half the height of the silo 401. The front wall 410 then further extends at an angle of about 45° from the horizontal, towards the centre of the silo 401, along the chamfer of the respective side walls 408, 409. The angled portion of the front wall 410 extends horizontally seen approximately one third of the distance from the front wall 410 to the rear wall 411 of the waste object chamber 405.

Similarly to the embodiment described in connection to FIGS. 6*a* and 6*b*, the silo 401 shown in FIGS. 7*a* and 7*b* has an axle (not shown in FIGS. 7*a* and 7*b*) extending between two side walls 408, 409, along an axis 424. The hatch 406 has two hatch sections 419, 420. When in a closed position of the hatch sections 419, 420, the lateral hatch section 420 is formed by a wall section symmetric to the angled portion of the front wall 410. The lateral hatch section 420 is pivotably connected to the rear wall 411, the upper edge of the lateral hatch section hinging on the bottom edge of the rear wall 411. The lower hatch section 419 is pivotably connected to the axle on the outside of the side walls 408, 409, and provides a rounded floor to the waste object chamber 405. The lower hatch section 419 includes on one side adjacent to the side wall 408 a gear 421 in the form of toothed circle section. The gear 421 is driven, to make the hatch section 419 pivot about the axis 424, by a pinion 422 mounted on the side wall 408. The pinion 422 is driven by a motor located on the inside of the waste object chamber 405. The lateral hatch section 420 has transversal extension 423, extending along the side walls 408, 409, and connecting to the lower hatch section 419.

The fully open position of the hatch sections 419, 420 is shown in FIG. 7*b*. The pinion 422 has driven the lower hatch section 419 to rotate about the axis 423, moving the floor portion of the lower hatch 419 adjacent to and overlapping the angled portion of the front wall 410. The movement of the lower hatch section 419 has pushed on the extension 423 of the lateral hatch section 420 to pivot the lateral hatch section 420 about the hinging connection to the rear wall 411. The lateral hatch section 420, in its opened position, essentially extends along the support upright 403.

Figures 8A, 8B:
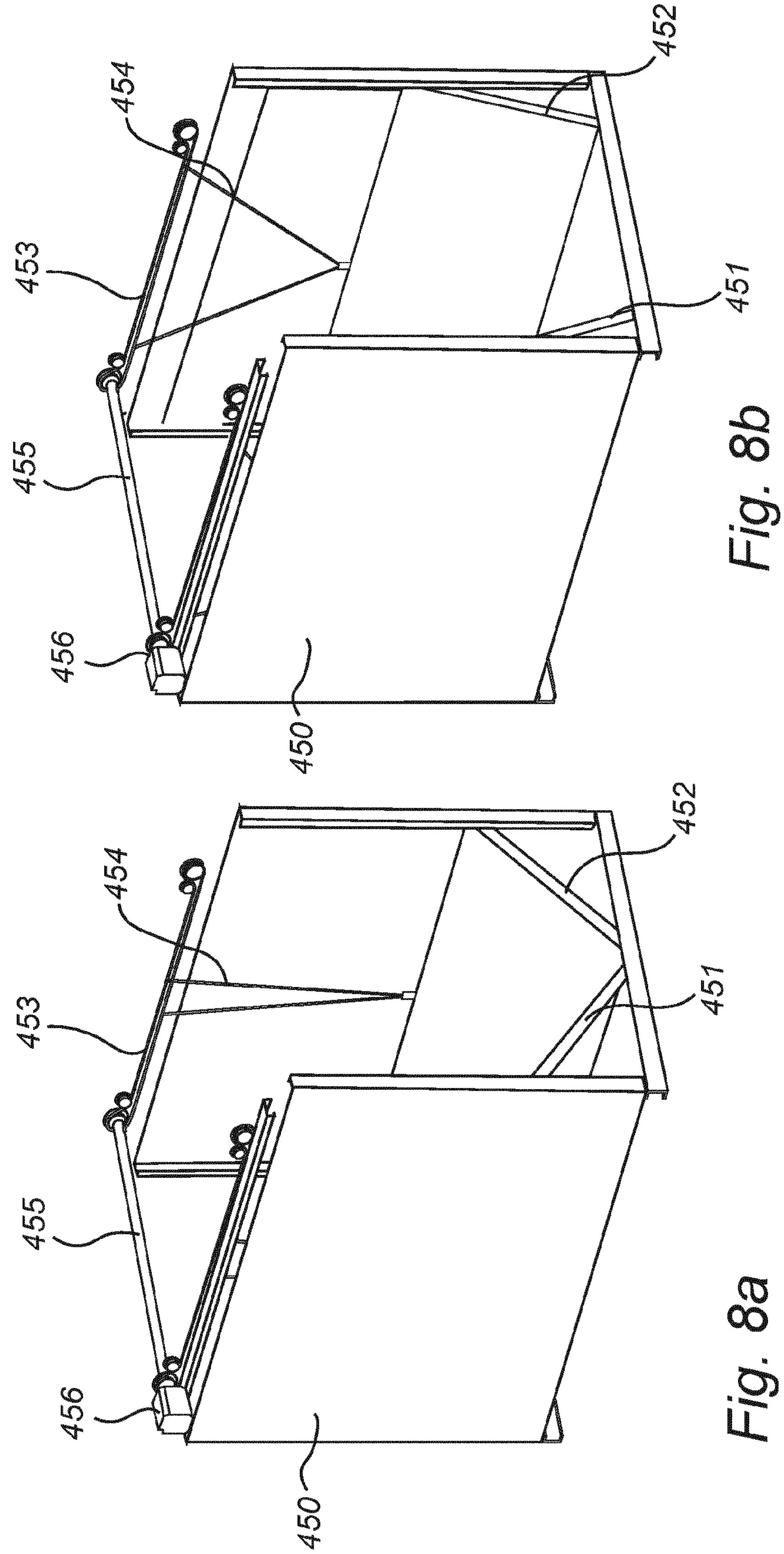
FIGS. 8*a* & 8*b* show in perspective view a further alternative embodiment of the hatch of the silo.

An alternative embodiment of a hatch of the silo is illustrated in FIGS. 8*a* and 8*b*. Here, the silo 450 is provided with two hatch section 451, 452. In the closed position of the hatch, seen in FIG. 8*a*, the rectangular hatch sections 451, 452 form a V-shaped floor of the waste object chamber of the silo 450. Each hatch section 451, 452 is arranged with an edge adjacent to a side wall of the silo, with the corners of that edge of the hatch section slidable along the vertical edges of the side wall. The corners of the opposite edge of the respective hatch section 451, 452 are slidable in the transversal direction, along the bottom edge of the front and rear walls of the silo 450.

A belt drive 453 is arranged on the top edge of each side wall of the silo 450, looping between the two top corners of each respective side wall. A flexible link 454 is attached at two point on the belt drive 453, so that a rotation of the belt drive brings the two attachment points of the link 454 closer together or farther apart, depending on the direction of rotation of the belt drive 453. The flexible link 454 is further attached at its midpoint to the edge of a hatch section 451, 452.

When the rotation of the belt drive 453 brings the attachment points of the link 454 farther apart, the hatch section 451, 452 is pulled up along the side wall of the silo. As illustrated in FIG. 8*b*, the hatch sections 451, 452, in the opened position of the hatch sections, are substantially parallel to the side walls of the silo 450. When the belt drive 453 brings the attachment points of the link 454 back closer to each other, the hatch sections 451, 452 slide back down to their closed position.

The size of the silo 401, 450 is preferably equal to or smaller than the volume of the storage bin 407, such that the storage bin 407 is able to receive the amount of waste objects 2 that may be buffered in the silo 401, 450 when the hatch 406 is closed.

Further possible alternative embodiments of the hatch of the silo exist. For example, a mechanism in which the hatch sections slide up into the opened position of the hatch at the centre of the silo, instead of along the side walls as described above, is possible. Only one driving mechanism for moving the hatch sections would then be needed.

A silo in the form of a rotatable cylinder, the axis of the cylinder being horizontal, is another alternative. With appropriate placement of openings in the mantle of the cylinder, the silo could rotate about its axis to change between a buffering condition and a delivering condition, while always allowing the silo to receive waste objects from the carrier arrangement.

Figures 9A, 9B, 9C:
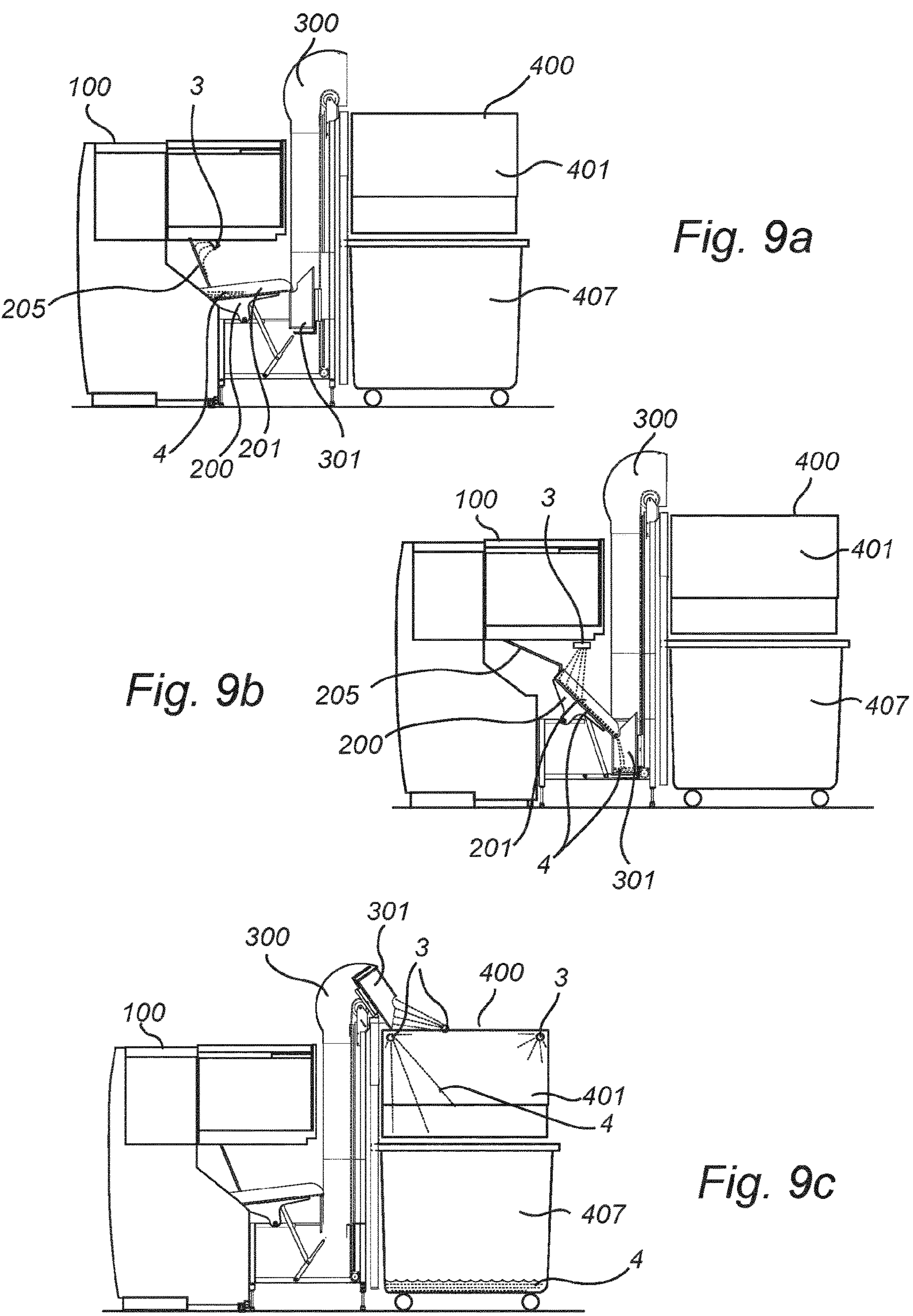
FIGS. 9*a-c* illustrate in side view different locations of liquid nozzles and how liquids are transported in the system.

FIGS. 9*a-c* show different possible locations and orientations of liquid nozzles 3 for cleaning of the system 1 and/or the silo arrangement 400. The liquid nozzles are preferably located to efficiently rinse surfaces that are the most likely to be soiled by residual liquid from UBCs. A liquid nozzle 3 can be oriented to spray cleaning liquid to the guide member 205, as in FIG. 9*a*, and a liquid nozzle 3 can be oriented to spray to the buffer receptacle 201, as in FIG. 9*b*. The liquid nozzle 3 directing cleaning liquid to the buffer receptacle 201 and the liquid nozzle 3 directing cleaning liquid to the guide member 205 may be the same liquid nozzle or two different liquid nozzles. There may be an orientation of the liquid nozzle 3 that allows the liquid nozzle 3 to direct cleaning liquid to the guide member 205 or to the buffer receptacle 201, depending on the position of the buffer receptacle 201. Alternatively, the liquid nozzle 3 may be controlled to change orientation. The cleaning liquid may advantageously be any suitable water and soap mixture.

A liquid nozzle 3 may be located in the carrier 301. Alternatively, the liquid nozzle 3 directing cleaning liquid to the carrier 301 may be external to the carrier 301, but still oriented so as to direct liquid to the inside of the carrier 301. For example, such a liquid nozzle may be mounted on the housing of the carrier arrangement 300, or on the stand of the silo arrangement 400, as shown in FIG. 9*c*. FIG. 9*c* also shows two liquid nozzles 3 in the silo 401. The liquid nozzles 3 in FIG. 9*c* are shown in respective upper corners of the silo 401. The liquid nozzles 3 may alternatively be mounted at any suitable location in the silo 401. There may alternatively be a single liquid nozzle, or more than two liquid nozzles in the silo 401.

FIGS. 9*a-c* also illustrate how the buffer arrangement 200, the carrier arrangement 300 and the silo arrangement 400 are adapted to collect, carry, and transport liquids 4. The collected, carried, and transported liquids 4 can be both cleaning liquid from the liquid nozzles 3, and residual liquids from UBCs 2. FIG. 9*a* shows how cleaning liquid 4 directed at the guide member 205 falls down into the buffer receptacle. The buffer arrangement 200 is shown in the first, buffering condition, with the buffer receptacle 201 tilted toward the RVM. The tilting of the buffer receptacle 201 prevents the liquids 4 from flowing out of the buffer receptacle 201.

As shown in FIG. 9*b*, when the buffer arrangement 200 is in the delivering condition and the buffer receptacle 201 is tilted toward the carrier 301, the liquids 4 contained in the buffer receptacle 201 flow into the carrier 301. The liquid nozzle 3 can deliver cleaning liquid to the buffer receptacle 201 concurrently with the buffer receptacle 201 delivering its content to the carrier 301.

In turn, as shown in FIG. 9*c*, the liquids contained in the carrier 301 are delivered to the silo arrangement 400. The liquid nozzle 3 of the carrier 301 can deliver cleaning liquid to the carrier 301 concurrently with the delivery to the silo arrangement 400 or at any suitable time.

If the silo 401 is in the buffering condition, liquids 4 are, at least to some extent, contained in the silo 401. When the silo 401 is in the delivering condition, the liquids 4 are delivered to a storage bin 407 positioned underneath the silo arrangement 400. The storage bin 407 may either be adapted to collect the liquids from the system as disclosed above, and to deliver those together with any waste objects 2 to a transport, such as in a lorry, for further handling and potential recycling. Alternatively, the storage bin 407 may be provided with a liquid outlet and potentially a nipple for connection to a drain or sewer in the backroom.

The buffer receptacle 201, the silo 301 and the carrier 401 are each preferably constructed at least drip tight in order to be able to collect, carry, and transport the liquids 4 in question.

Figures 10A, 10B:
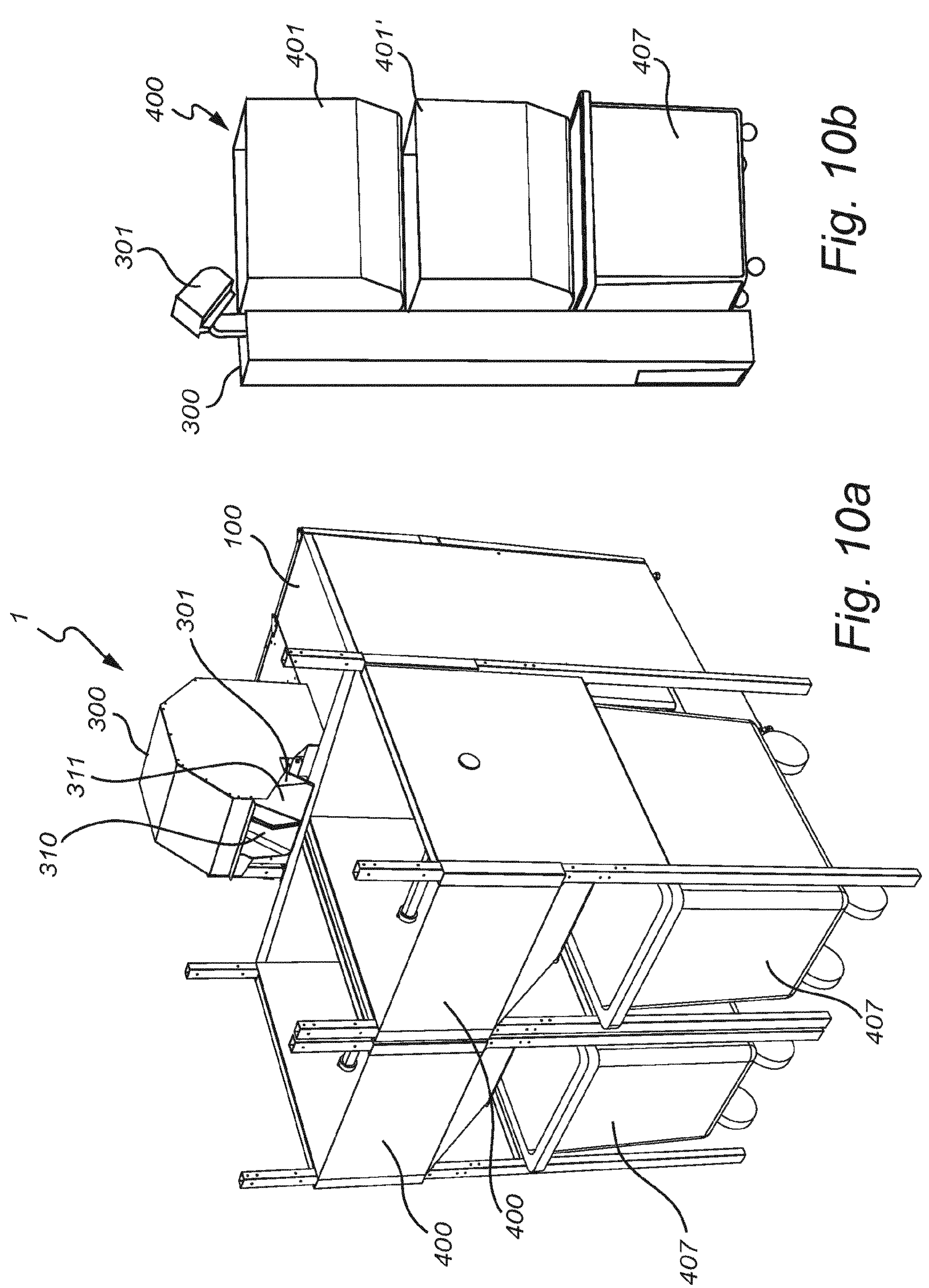
FIGS. 10*a-c* illustrate in perspective view the modularity of the system in three different embodiments.
Figure 10C:
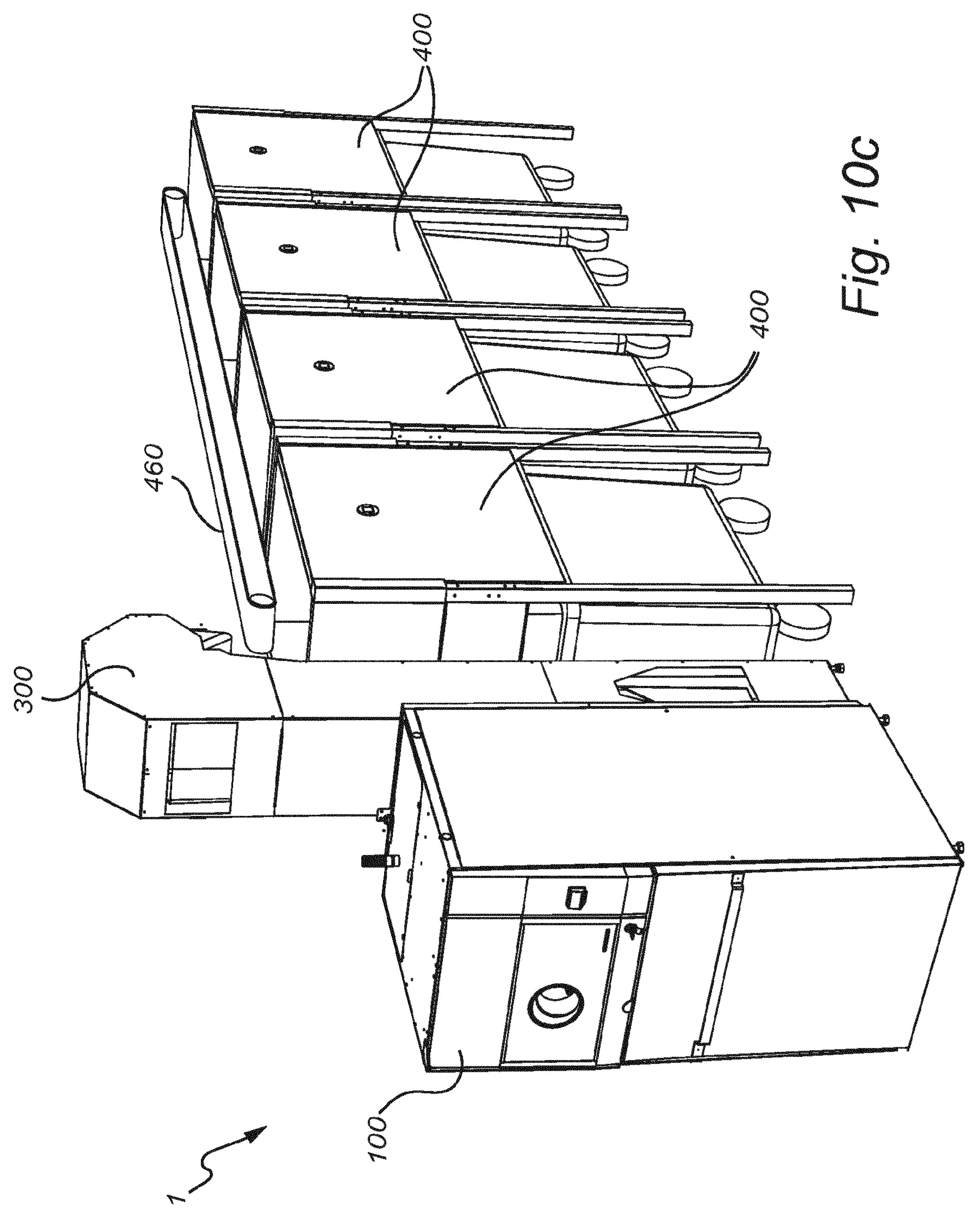

FIGS. 10*a-c* show, in perspective view, how silo arrangements 400 can be differently combined and arranged, providing modularity to the system, and making it possible to fully take advantage of the available space in a backroom. As illustrated in FIG. 10*a*, the system 1 can comprise one RVM 100, one carrier arrangement 300 and two silo arrangements 400. The carrier 301 of the carrier arrangement is in this case divided into to two sections 310, 311, each section delivering its content to a respective silo arrangement.

FIG. 10*b* illustrates how a silo arrangement 400 can comprise two silos 401, 401' stacked on top of each other. The storage capacity of the silo arrangement 400 is doubled without adding to the foot-print of the system 1.

As illustrated in FIG. 10*c*, the storage capacity of the system 1 can also be increased by aligning several silo arrangements 400. The carrier arrangement 300 can then deliver the waste objects (not shown in FIG. 10*c*) to a conveyor 460, which is adapted to direct the waste object to the appropriate silo arrangement 400, as needed.

It should be noted that the container return system of the present disclosure may be used in combination with other types of UBC receiving systems. One such system is the professional bulk receiving system as discussed earlier in the description. Consequently, the system is not depending on whether the waste objects 2 are delivered to the system one-by-one or many at a time. The system may also be used without a deposit-return system, and it may be limited to merely recognizing that an allowable waste object is entered. In such a case there is no need for at least any validation means, validation in this case implying that a recognised waste object is given a specific value depending on its type. Finally, the container return system is not necessarily applied to waste objects that should be crushed or compressed, but could also be used with the waste object being recycled intact, i.e. reused. The storage bin used in the system could also be provided with a plastic bag to handle the waste objects, and if so, the storage bin does not need to be either drip tight or even a closed container, but could be a roller cage or similar known system.

The embodiments of the silo arrangement above have a separable stand, however, the silo arrangement may be provided with an integral stand with either fixed or extendable support uprights or legs.

Figure 11:
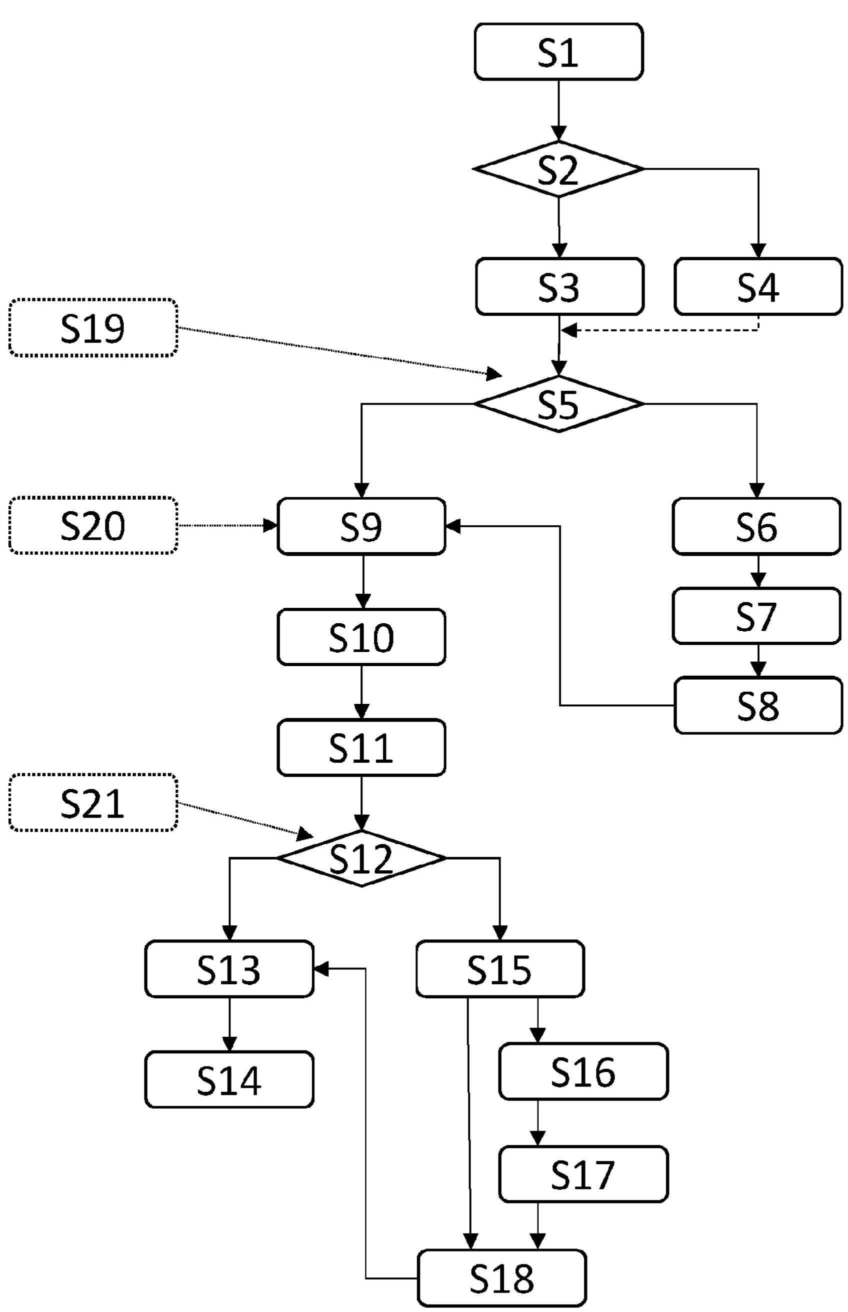
FIG. 11 is a flowchart of a process according to an embodiment of the present disclosure.

FIG. 11 illustrates a process according to an aspect of the present disclosure of transporting and collecting waste objects by a system for collecting waste objects for recycling. The system consequently comprises the container return system, the buffer arrangement having the buffer receptacle, the carrier arrangement having the carrier, the silo arrangement having the silo, and the storage bin located vertically seen underneath the silo.

Step S1 consists of recognizing and preferably devaluating a waste object, for example, and as disclosed above, crushing a glass bottle, or compacting aluminum can or PET bottle.

In Step S2, a choice is made to either deliver the devaluated waste object to a first buffer arrangement (Step S3) or to an additional buffer arrangement (Step S4). If there is only one buffer arrangement this step is skipped.

If the waste object is delivered to the additional buffer arrangement of step 4, the process continues in the additional buffer arrangement similarly as if the waste object was delivered to the first buffer arrangement, as signified by the dashed line connecting Step S4 to the process following Step S3.

In Step S5, the waste object having been delivered to the buffer arrangement (Step S3, Step S4), the process proceeds to a delivery condition (Step S9) or a buffer condition (Step S6) depending on whether the carrier arrangement is positioned to receive the waste object from the buffer arrangement or not.

If the carrier arrangement is not positioned to receive the waste object from the buffer arrangement, the waste object is buffered in the buffer arrangement (Step S6). At some later point in time, the carrier of the carrier arrangement is moved down to the first location having the first elevation (Step S7). During part of the displacement of the carrier toward the first location, the carrier abuts the buffer receptacle, directly or indirectly, of the buffer arrangement, to move the buffer arrangement into the delivering condition of the buffer arrangement (Step S8). The carrier being in the first location, positioned to receive the waste object from the buffer arrangement, and the buffer arrangement being in the delivering condition, the waste object is then delivered to the carrier (Step S9).

If it is found in Step S5 that the carrier is positioned to receive the waste object from the buffer arrangement, the waste object is delivered to the carrier according to Step S9.

The waste object having been delivered to the carrier, the carrier is moved up toward the second location having the second elevation. The second elevation is higher than the first elevation (Step S10). At the second location, the waste object is delivered to the silo arrangement (Step S11).

In Step S12, the process proceeds to a delivering condition when the silo arrangement is in the first, delivering condition. Then the waste object is delivered to the storage bin under the silo (Step S13). At some point later in time, the silo arrangement is switched from the first, delivering condition to the second, buffering condition (Step S14).

If, in Step S12, the silo arrangement is in the second, buffering condition, the waste object is buffered in the silo of the silo arrangement (Step S15). The silo arrangement can then as some point in time be switched from the second, buffering condition to the first, delivering condition (Step S18). The waste object is then delivered to the storage bin under the silo according to Step S13.

If needed, when the waste object is buffered in the silo of the silo arrangement according to Step S15, the storage bin under the silo can be removed for emptying or further transport (Step S16). The emptied storage bin, or another empty storage bin, is then placed under the silo arrangement (Step S17). The process then continues with switching the silo arrangement to the first, delivering condition according to Step S17.

The process may further optionally comprise the steps of delivering a cleaning liquid, for example water, by at least one liquid nozzle, to the buffer arrangement (Step S19), to the carrier arrangement (Step S20), and/or to the silo arrangement (Step S21). The liquid delivered is then contained in the buffer arrangement, the carrier arrangement, or the silo arrangement, and is later carried and delivered to the next component of the system concurrently with any waste object present, as well as any residual liquid from the waste object. The liquid delivered to the buffer arrangement in Step S19 thus enters the process at Step S5. The liquid delivered to the carrier arrangement enters the process at Step S9. The liquid delivered to the silo arrangement enters the process at Step S12.

A new process can start from Step S1 with a different waste object at any time during the original process.

Figure 12:
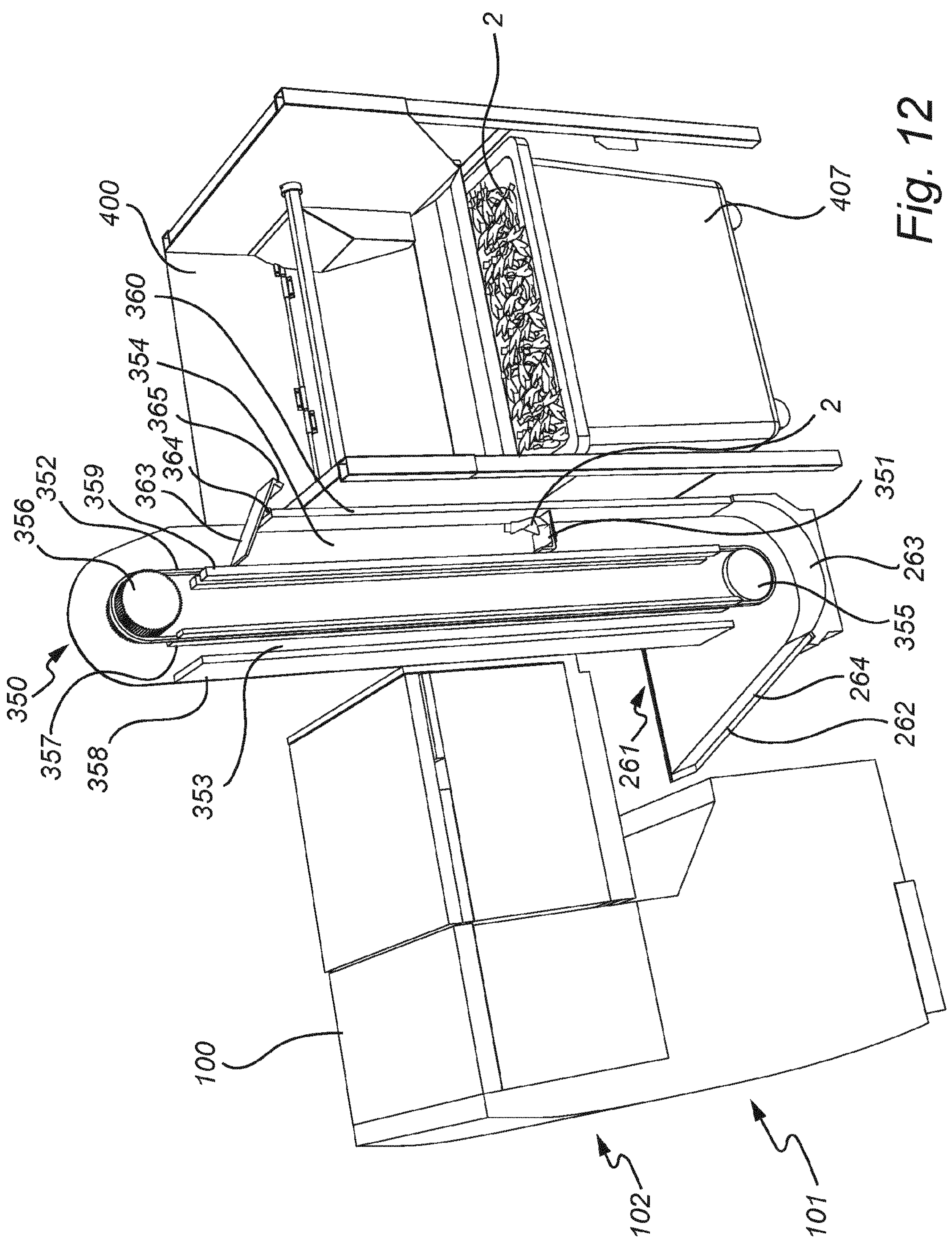
FIG. 12 is an illustration in perspective view of an embodiment of a system according to the disclosure.

FIG. 12 is a schematic illustration in perspective of an embodiment of a system according to one aspect of the present disclosure in use. Features of generally similar kind and purpose are given similar numbering in comparison to what is disclosed in previous figures. The system shown in FIG. 12 comprises an RVM 100, a buffer arrangement 260, a carrier arrangement 350 with a carrier 351, and a silo arrangement 400 with a silo 401. The system according to this embodiment can be arranged to receive different types of objects and mix them together in a single object stream through the buffer arrangement 260, carrier arrangement 350, silo arrangement 400, and storage bin 407. The system can alternatively be arranged to receive only one kind of waste object. Alternative embodiments may include multiple buffer arrangements and carrier arrangements, in which case sorting means are provided. For a more detailed description of the RVM 100, the disclosure in relation to FIG. 1 may be consulted.

In this embodiment, the buffer arrangement 260 and carrier arrangement 350 are arranged with a common housing. The housing comprises two side walls, although only one side wall 361 is visible in FIG. 12. The other side wall has been removed to better disclose the features of the system. Likewise, a side wall and a section of the hatch of the silo arrangement have been removed in FIG. 12.

The buffer arrangement 260 has an opening 261 which is vertically aligned with an outlet (not shown in FIG. 12) of the RVM 100 such that a waste object 2 which is ejected or dropped from the RVM 100 through the outlet falls into the opening 261 and lands on a receiving area 262 of the buffer arrangement 260. The receiving area 262 has sliding means 264 in the form of an inclined surface, on which the waste object 2 slides towards the first location 263, at the bottom of the buffer arrangement 260.

Once the waste object has passed through the opening of the buffer arrangement 260 and reached the receiving area 262, the waste object 2 is prevented from falling out of the buffer arrangement 260 by the side walls 361 of the housing.

The carrier arrangement 350 has a carrier 351 mounted to and arranged to be driven by a chain drive 352 which extends between two vertically aligned sprockets 355, 356. The chain drive defines a closed loop path along which the carrier 351 is thus arranged to move. The chain drive is itself driven by a motor (not shown in FIG. 12) driving the bottom sprocket to rotate. As an alternative to a chain drive, a belt drive could be used to the same effect.

The carrier arrangement 350 comprises an outer front wall 358 and an outer back wall 360, which are both vertical and perpendicular to the side walls 361 of the housing. The outside front wall 358 is facing the RVM, whereas the outside back wall 360 is facing the silo arrangement. An inner front wall 357 and an inner back wall 359 are arranged along the respective vertical extensions of the chain drive 352. The outer front wall 358, inner front wall 357, inner back wall 359, and outer back wall 360 are of substantially the same width and parallel to each other.

The side walls 361 of the housing, the outer front wall 358, inner front wall 357, inner back wall 359, and outer back wall 360 form a tubular structure, inside which the carrier 351 is arranged to move, driven by the chain drive 352. In particular, a front portion 353 of the tubular structure is defined by the side walls 361, the outer front wall 358 and inner front wall 357. A back portion 354 of the tubular structure is defined by the side walls, the inner back wall 359 and the outer back wall 360.

The carrier 351 is shown in FIG. 12 in the back portion 354 of the tubular structure, moving vertically upward while transporting a waste object 2. Following the closed loop path defined by the chain drive 352, the carrier would move vertically downward in the front portion 353 of the tubular structure.

A rectangular flap 363 is pivotably mounted to the outer back wall 360, with a pivot axis 364 extending horizontally along the top edge of the outer back wall 360. The flap has substantially the same width as the walls 357, 358, 359, 360. In a closed position, the flap 363 extends from its pivo axis 364 toward the inner back wall 359 such that an edge of the flap 363, parallel to the pivot axis 364, rests on the inner back wall 359. In this position, the flap 363 thus acts as lid, preventing any object from falling into the back portion 354 of the tubular structure. As will be further described below, the flap 363 can pivot to an open position, pushed by the carrier 351 and/or a waste object 2 transported thereon. The flap 363 is provided with a counterweight 365. The speed at which the flap 363 returns to its closed position, after having been opened e.g. to let a carrier 351 pass through, can be adjusted by an appropriate choice of counterweight.

It should be noted that although the carrier arrangement 350 in FIG. 12 is shown with a single carrier 351, the carrier arrangement 350 may comprise a plurality of carriers 351 distributed around the chain drive 352. In a given carrier arrangement 350, increasing the number of carriers 351 increases the capacity of the carrier arrangement 350 to transport waste objects 2 received from the buffer arrangement 2 and deliver the waste objects 2 to the silo arrangement 400. The capacity of the system is however also limited by the speed at which the RVM 100 can process waste objects.

Figures 13A, 13B, 13C:
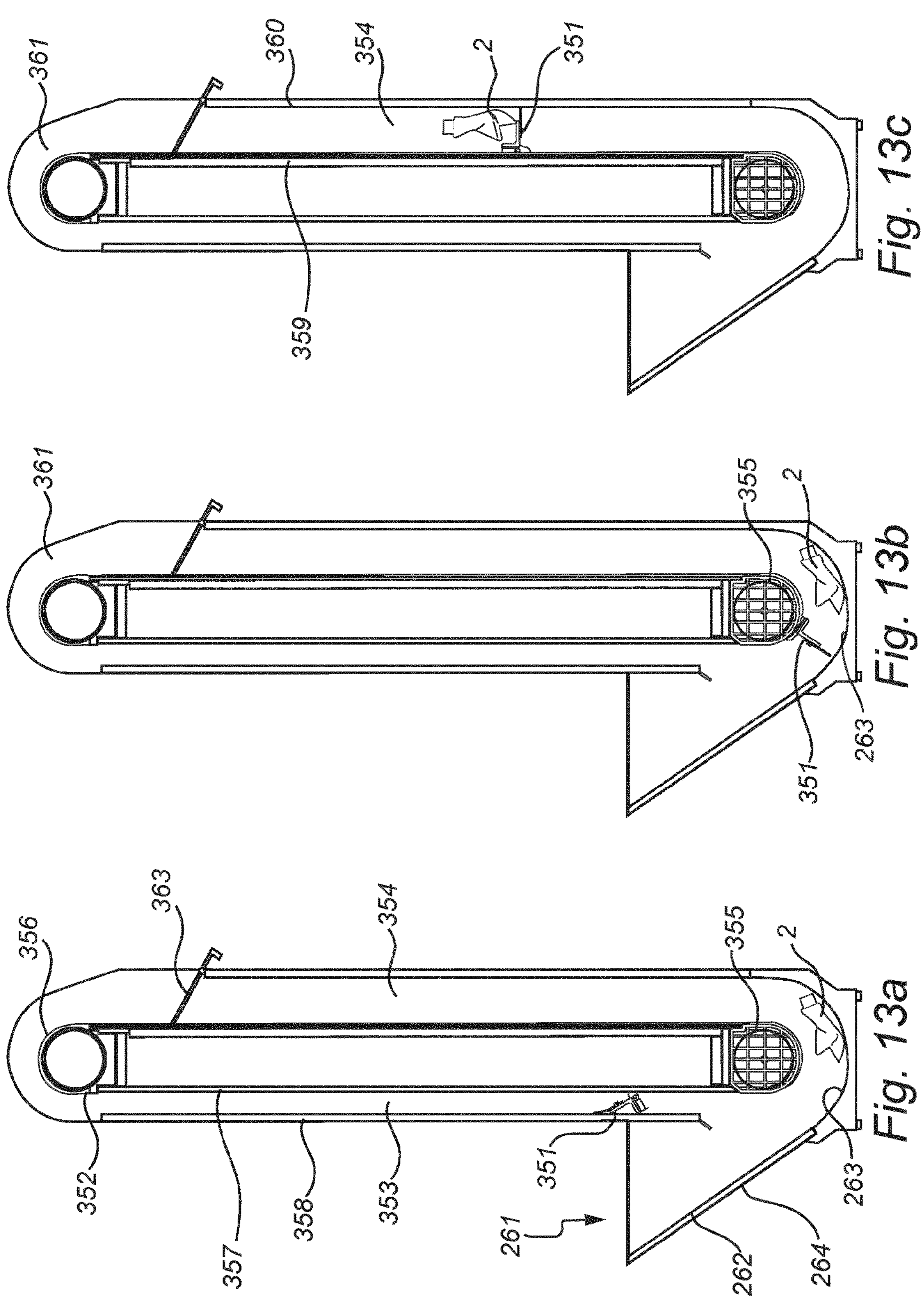
FIGS. 13*a-e* show a side projection of an embodiment of the buffer and carrier arrangements, with the carrier in different positions.
Figure 13E:
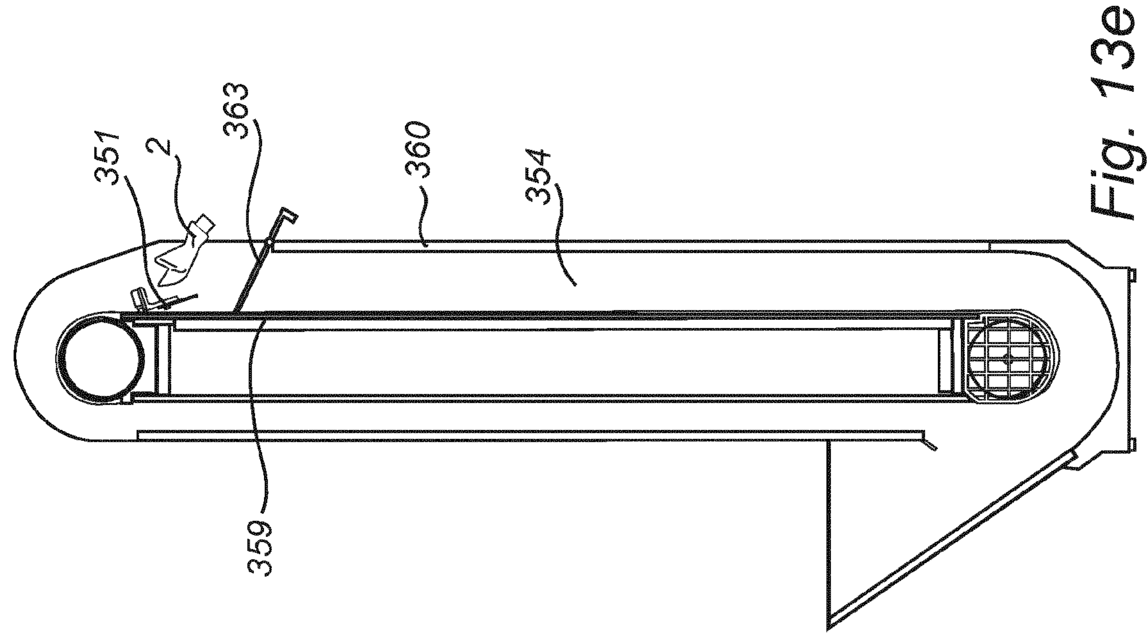
Figure 13D:
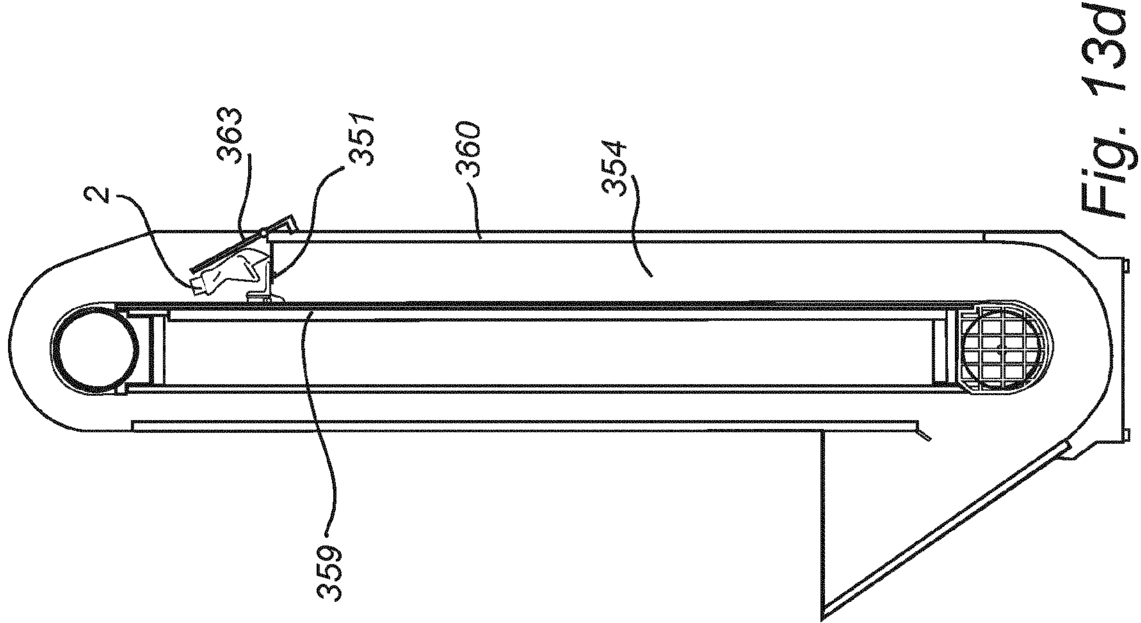

FIGS. 13*a-e* show side projections of the buffer and carrier arrangements of FIG. 12 with the carrier 351 in different positions. It shows a sequence in which:

FIG. 13*a*: the carrier 351 travels vertically downward in the front portion 353 of the tubular structure, FIG. 13*b*: the carrier 351 reaches the bottom 263 of the buffer arrangement and is moving around the bottom sprocket 355, about to scoop up the buffered waste object 2, FIG. 13*c*: the carrier 351 is carrying the waste object 2 vertically upward in the back portion 354 of the tubular structure, FIG. 13*d*: the carrier 351 reaching the top of the back portion 354 of the tubular structure, the carried waste object 2 pushing the flap 363 to pivot toward an open position to let the waste object 2 and carrier 351 pass through, FIG. 13*e*: the carrier 351 and waste object 2 having passed the flap 363, the carrier 351 is tilted downward, letting the waste object 2 fall toward the silo arrangement (not shown in the figure).

In more detail, in FIG. 13*a*, a waste object 2 is buffered at the bottom 263 of the buffer arrangement. It has been received from the RVM (not shown in FIG. 13*a*), entering the buffer arrangement through the opening 261 and landing on the receiving area 262. Thereafter, the waste object 2 has been transported to the bottom 262 of the buffer arrangement, sliding on the inclined surface 264. The carrier 351 is traveling vertically downwards in the front portion 353 of the tubular structure of the carrier arrangement, driven by the chain drive 352. The flap 363 is in its closed position.

As is apparent in FIG. 13*a*, the front portion 353 of the tubular structure is narrower than the back portion 354 of the tubular structure. Since the carrier 351 does not transport any waste object 2 while traveling downward in the front portion 353 of the tubular structure, it can travel therein in a tilted position to fit between the outer front wall 358 and the inner front wall 357. This arrangement provides a more compact system, minimizing the distance between the front of the system, towards the RVM (not shown in FIG. 13), and the back of the system, towards the silo arrangement (not shown in FIG. 13).

In FIG. 13*b*, the carrier 351 is traveling along its path, around the bottom sprocket 355. While traveling around the sprocket 355, the carrier 351 extends radially from the sprocket 355. The bottom 263 of the buffer arrangement has an arcuate surface, such that a distal end of the carrier 351 follows the arc of the bottom surface 263 while the carrier 351 is traveling around the sprocket 255. The carrier 351 extends transversally between the side walls 361 of the housing. Thus, any waste object 2 present at the bottom of the buffer arrangement, such as depicted in FIG. 13*b*, will be scooped up and pushed by the carrier 351.

FIG. 13*c* shows the carrier 351 traveling and transporting the waste object 2 vertically upward in the back portion 354 of the tubular structure. Here, the carrier 351 is in a horizontal position, extending between the side walls 361, and between the inner back wall 359 and the outer back wall 360. The waste object 2 is thus prevented from falling out of the carrier arrangement, and from falling backward into the back portion 354 of the tubular structure, below the carrier 351.

In FIG. 13*d*, the carrier 351 has reached the top of the back portion 354 of the tubular structure and the waste object 2 is pushing the flap 363 to pivot toward and open position. Here, the waste object 2 is above the top edge of the outer back wall 360. The waste object is however still constrained by the carrier 351, the side walls 361, the inner back wall 359, and the flap 363 itself.

Once the waste object 2 and the carrier 359 reaches an elevation higher than the edge of the flap 363, the flap 363 tilts back toward its closed position under its own weight. When the carrier 351 further moves beyond the top edge of the inner back wall 359, the carrier 351 is released to tilt down, thereby dropping the waste object 2 to fall into the silo arrangement (not shown in FIG. 13*e*). The flap 363 being in the closed position prevents the waste object from falling back down in the back portion 354 of the tubular structure.

In the event of a malfunction of the flap 363 causing a waste object to fall back into the back portion 354 of the tubular structure, that waste object 2 is transported back up from the bottom 263 of the buffer arrangement at the next passage of the carrier 351.

Thereafter, the carrier 351 moves around the top sprocket 356 and vertically down in the front portion 353 of the tubular structure, as shown in FIG. 13*a*. The carrier 359 continuously moves along its path, in the sequence depicted in FIGS. 13*a-e*. New waste objects 2 can be received by the buffer arrangement at any time during this sequence.

The front 353 and back 354 portions of the tubular structure are shown in FIGS. 12 and 13 with rectangular cross-sections. Alternative shapes of the cross-sections are conceivable.

Figures 14A, 14B, 14C:
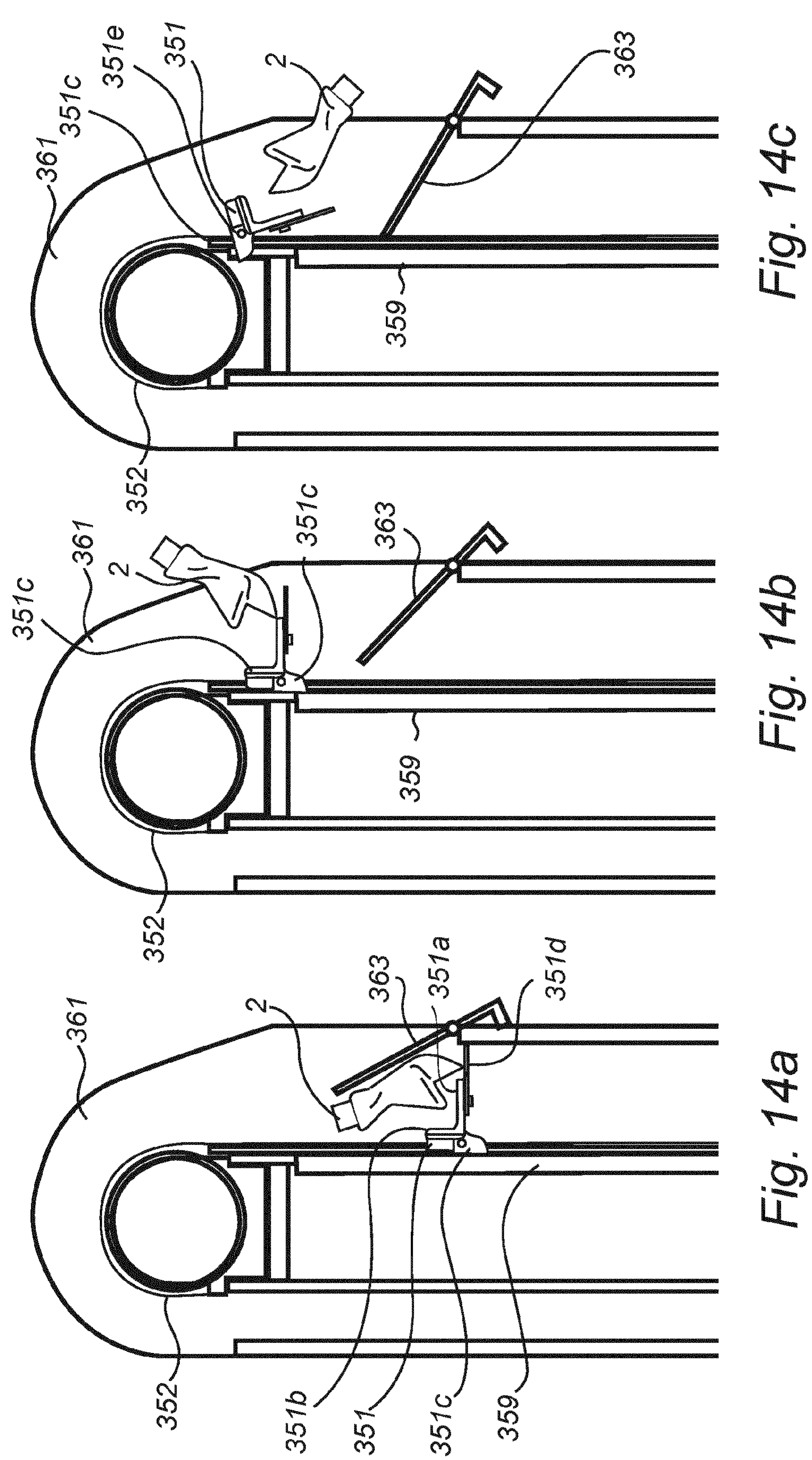
FIGS. 14*a-c* show a close up view of part of a carrier arrangement with the carrier in different positions.

The carrier 359 is shown in greater detail in FIGS. 14*a-c*. In this embodiment, the carrier 359 takes the form of a paddle with a generally flat surface for pushing the waste object 2. The paddle comprises a main surface portion 351*a*. The width of the main surface portion 351*a* corresponds to the inner width of the tubular structure, i.e. the main surface portion 351*a* extends substantially from one side wall 361 to the other, while allowing free movement of the paddle in relation to the side walls 361. A flexible secondary surface portion 351*d* is attached to the main surface portion 351*a*, such that the combined depth of the main 351*a* and secondary 351 *d* surface portions corresponds to the distance between the inner back wall 359 to the outer back wall 360. During a displacement of the paddle 351 in the back portion 354 of the tubular structure, when the paddle 351 is in a horizontal position, an extremity of the secondary surface portion 351 *d* is in contact with and slides against the outer back wall 360. The secondary surface portion 351*d* may consist of a single portion of flexible material or may be divided in several fingers or strings.

The combined surface of the paddle 351 thus extends substantially the whole inner cross-section of the back portion 254 of the tubular structure, when in a horizontal position as in FIG. 14*a*.

In general, an RVM or system for collecting waste objects for recycling is configured for only accepting a certain range of object and there is a predetermined maximum length of the acceptable objects.

The dimensions of the paddle 351 and tubular structure 354 are preferably chosen such that a devaluated waste object 2, such as a PET-bottle cannot fit lying down on the paddle 351. This may force the containers to have a more up-right orientation while traveling. These dimensions help minimize the risk of entanglement and friction against the walls 359, 360, 361 of the tubular structure 354. For example, for a PET bottle which when used has a width of about 70 to 90 mm and a height of about 330 mm which height becomes slightly longer when devaluated, the dimensions of the paddle 351 may have a width of 172 mm and depth of 152 mm. Such compact dimensions also allow the paddle 351 to be driven by a single chain drive 352, keeping costs down. Even a compact paddle 351 of these dimensions is able to transport up to 15 objects concurrently.

The mechanism by which the paddle 351 is tilted to release the waste object 2 is also shown more clearly in FIGS. 14*a-c*. The positions of the paddle in FIGS. 14*a* and 14*c* correspond to the positions shown in FIGS. 13*d* and 13*e*, respectively. The paddle 351 is mounted to the chain drive 352 at a pivot axis 351*e*. During its displacement in the back portion 354 of the tubular structure, the paddle 351 remain horizontal thanks to a support portion 351*c* which slides against the inner back wall 359 and prevent the paddle 351 from pivoting about pivot axis 351*e*.

FIG. 14*b* shows the paddle 351 reaching the top of the inner back wall 359. The support portion 351*c* is still partly in contact with the inner back wall 359, preventing the paddle 351 from pivoting about pivot axis 351*e*. Shortly thereafter, as shown in FIG. 14*c*, having passed the top of the inner back wall 359, the support portion 351*c* loses contact with the inner back wall 359 entirely, and the paddle is released to pivot freely about pivot axis 351*e*, thereby releasing the waste object 2 to fall toward the silo arrangement (not shown in FIG. 14*c*).

Alternative solutions to release the waste object 2 can be conceived, such as, for example, a mechanism to scrape off the waste object from the paddle 351, the paddle 351 remaining horizontal.

In the embodiments described in connection to FIGS. 12-14, the tilting of the paddle 351 and the opening/closing of the flap 363 is achieved by purely mechanical means, using only the own weight of the components. This is a simple and reliable solution that also keeps costs down. Alternative systems may use actuators to tilt the paddle 351 and flap 363, allowing precise timing of the different operations.

Further, the chain drive 352 may suitably rotate at a constant speed, with the carrier or carriers 351 continuously moving around their path independently of a rate of filling of the buffer arrangement. The system could alternatively comprise control and processing means to adjust the speed of the carriers 351 depending on the rate of filling of the buffer arrangement.

Itemized List of Embodiments

Item 1. A system (1) for collecting waste objects (2) for recycling, such as deposit-return objects, comprising:
- a container return system (100) having an inlet (102), recognition means (103) and an outlet for a waste object; and
- a carrier arrangement (300) adapted to receive the waste object (2) from the container return system (100) at a first location having a first elevation, and adapted to transport and deliver the waste object to a second location for storage or further transport, the second location having a second elevation which is vertically seen higher than the first elevation;
- characterized in that
- the system (1) further comprises a buffer arrangement (200) which is adapted to receive the waste object (2) from the container return system (100), and which is adapted to deliver the waste object (2) to the carrier arrangement (300), whereby the buffer arrangement (200) enables the container return system (100) and the carrier arrangement (300) to be operable independently from one another.

Item 2. A system (1) according to item 1, wherein the buffer arrangement (200) is adapted to deliver the waste object (2) to the carrier arrangement (300) concurrently with the carrier arrangement (300) being located in the first location.

Item 3. A system (1) according to any preceding item, wherein the container return system (100) is adapted to receive waste objects (2) of different materials and/or different sizes, and the waste objects (2) of different materials and/or different sizes are mixed together.

Item 4. A system (1) according to any one of the preceding items, wherein the carrier arrangement (300) has at least two compartments (310, 311) for carrying waste objects (2), each compartment of the at least two compartments (310, 311) preferably being adapted for carrying waste objects (2) of different materials and/or different sizes.

Item 5. A system (1) according to any one of the preceding items, further comprising at least one additional carrier arrangement (300) adapted to transport and deliver the waste object (2) for storage or further transport, and at least one additional buffer arrangement (200) adapted to deliver the waste object (2) to the additional carrier arrangement (300).

Item 6. A system (1) according to item 5, wherein the buffer arrangement (200) is adapted to selectively deliver the waste object (2) to the carrier arrangement (300) or to the additional carrier arrangement (300').

Item 7. A system (1) according to any one of the preceding items, wherein the buffer arrangement (200) has a first condition, in which the waste object (2) received by the buffer arrangement (200) is buffered therein, and a second condition, in which the waste object (2)

received by the buffer arrangement (200) is delivered to the carrier arrangement (300).

Item 8. A system (1) according to any one of the preceding items, wherein the carrier arrangement (300) comprises at least one independently operable carrier (301) adapted to move between the first location and the second location.

Item 9. A system (1) according to any one of the preceding items, wherein the buffer arrangement (200) is adapted to receive the waste object (2) from the container return system (100) irrespective of a location of the carrier (301).

Item 10. A system (1) according to any one of the preceding items, wherein the condition of the buffer arrangement (200) is determined by the location of the carrier (301).

Item 11. A system (1) according to item 10, wherein the buffer arrangement (200) is configured to be in the second condition of the buffer arrangement (200) if the carrier (301) is in the first location of the carrier (301).

Item 12. A system (1) according to any one of the preceding items, wherein the buffer arrangement (200) has a buffer receptacle (201) adapted to receive and distribute the waste object (2), which buffer receptacle (201) is adapted to tilt between a first position, in which the buffer arrangement (200) is in the first condition, and a second position in which the buffer arrangement (200) is in the second condition, preferably about a substantially horizontal axis (202).

Item 13. A system (1) according to item 12, wherein the carrier (301) and the buffer receptacle (201) are cooperating, such that at least a part of a displacement of the carrier (301) from the second location to the first location of the carrier (301) is adapted to tilt the buffer receptacle (201) from the first condition to the second condition of the buffer arrangement (200).

Item 14. A system (1) according to item 13, wherein the carrier (301), directly or indirectly, abuts the buffer receptacle (201) during at least the part of the displacement to tilt the buffer receptacle (201) from the first condition to the second condition of the buffer arrangement (200).

Item 15. A system (1) according to item 14, wherein the substantially horizontal axis (202) is located transversally in relation to the buffer receptacle (201).

Item 16. A system (1) according any one of items 13 to 15, further comprising a guide member (205) adapted to guide the waste object (2) from the container return system (100) to the buffer receptacle (201), wherein the guide member (205) preferably is displaceable such that the guide member (205) is adapted to guide the waste object (2) from the container return system (100) to the buffer receptacle (201) irrespective of the position of the buffer receptacle (201).

Item 17. A system (1) according to any one of the preceding items, wherein the buffer arrangement (200) is coupled to the container return system (100).

Item 18. A system (1) according to any one of the preceding items, further comprising a silo arrangement (400) having at least one silo (401), wherein each silo (401) comprises:

a mouth (404) at a vertically seen upper end, adapted to receive a waste object (2);

a waste object chamber (405); and a hatch (406) at the lowermost end of the waste object chamber (405), adapted to release and deliver the waste object (2) for storage or further transport, wherein the silo arrangement (400) has a delivering condition, in which the hatch (406) is generally open, and a buffering condition, in which the hatch (406) is generally closed for buffering the waste objects (2) for delivery at a later point in time.

Item 19. A system (1) according to item 18, further comprising a storage bin (407), wherein the silo arrangement (400) comprises a stand (402) onto which the silo (401) is arranged, in order for the storage bin (407) to be positionable vertically seen underneath the silo (401).

Item 20. A system (1) according to item 19, comprising at least two silos (401, 401') stacked on top of each other, wherein the stack of silos is arranged such that the uppermost silo (401) is adapted to receive the waste object (2) from the carrier arrangement (300), and adapted to release and deliver the waste object (2) to the silo (401') located vertically seen underneath the uppermost silo (401), and the bottommost silo (401') is adapted to release and deliver the waste object (2) to the storage bin (407) placed vertically seen underneath the bottommost silo (401').

Item 21. A system (1) according to any one of items 18 to 20, wherein the hatch (406) has a plurality of hatch sections (412, 413, 414), each hatch section (412, 413, 414) being pivotable about a respective pivot axis (424) between a closed position, in which the silo arrangement (400) is in the buffering condition, and an open position, in which the silo arrangement (400) is in the delivering condition and each pivot axis (424) being mutually substantially parallel.

Item 22. A system (1) according to any one of items 18 to 21, wherein a volume capacity of each silo (401) of the silo arrangement (400) is equal to or lower than a volume capacity of a storage bin (407) positioned underneath the silo arrangement (400).

Item 23. A system (1) according to any one of the preceding items, further comprising at least one liquid nozzle (3) adapted to deliver a cleaning liquid (4), such as water, into at least one component of the system (1) chosen from the group of the buffer arrangement (200), the carrier arrangement (300) and the silo arrangement (400), for cleaning of the system (1) and/or of the waste object (2).

Item 24. A system (1) according to any one of the preceding items, wherein the buffer arrangement (200), the carrier arrangement (300) and/or the silo arrangement (400) are adapted to collect, carry and deliver liquids (4) concurrently with the waste object (2).

Item 25. A system (1) according to item 24, wherein the buffer receptacle (201), the carrier (301) and the silo (401), when in the buffering condition of the silo arrangement (400), are drip tight in order to collect, carry and deliver liquids (4) concurrently with the waste object (2).

Item 26. A process of transporting and collecting waste objects by a system for collecting waste objects for recycling, such as deposit-return objects, the system comprising a container return system, a buffer arrangement and a carrier arrangement, wherein the process comprises the steps of:

receiving, by the buffer arrangement a waste object from the container return system (Step S3);

buffering (Step S6) the waste object by the buffer arrangement until the carrier arrangement is positioned to receive the waste object, which carrier arrangement is enabled to be operable independently from the container return system;

delivering the waste object from the buffer arrangement to the carrier arrangement at a first location having a first elevation (Step S9); and transporting and delivering the waste object by the carrier arrangement to a second location having a second elevation, the second elevation vertically seen higher than the first elevation (Steps S10, S11).

Item 27. A process according to item 26, wherein the step of buffering the waste object (Step S6) by the buffer arrangement is performed until the carrier arrangement is located in the first location, and the step of delivering the waste object from the buffer arrangement to the carrier arrangement (Step S9) is performed concurrently with the carrier arrangement being located in the first location.

Item 28. A process according to any one of items 26 to 27, further comprising the step of selectively delivering the waste object to the buffer arrangement, or to an additional buffer arrangement adapted to deliver the waste object to an additional carrier arrangement (Steps S2, S3, S4).

Item 29. A process according to any one of items 26 to 28, further comprising the step of delivering the waste object from the carrier arrangement at the second location to a silo arrangement (Step S11).

Item 30. A process according to any one of items 26 to 29, further comprising the step of independently operating a carrier of the carrier arrangement to move the carrier between the first location and the second location (Steps S7, S10).

Item 31. A process according to any one of items 26 to 30, further comprising the step of, during at least a part of a displacement of the carrier from the second location to the first location, abutting directly or indirectly, by the carrier, a buffer receptacle of the buffer arrangement in order to move the buffer arrangement from a buffering condition to a delivering condition of the buffer arrangement (Step S8).

Item 32. A process according to any one of items 29 to 31, further comprising the step of delivering a cleaning liquid, such as water, by at least one liquid nozzle into at least one component of the system chosen from the group of the buffer arrangement, the carrier arrangement and the silo arrangement (Steps S19, S20, S21).

Item 33. A process according to any one of items 29 to 32, further comprising the steps of:

collecting, carrying, and delivering, by a component of the system chosen from the group of the buffer arrangement, the carrier arrangement and the silo arrangement, a liquid originating from residual liquid contained in the waste object, or a cleaning liquid delivered into the buffer arrangement, the carrier arrangement or the silo arrangement.

Item 34. A process according to any one of items 29 to 33, further comprising the step of switching between a first condition and a second condition of the silo arrangement, in which first condition the silo arrangement releases and delivers the waste object for storage or further transport, and in which second condition the silo arrangement buffers the waste object therein, to be released and delivered at a later point in time (Steps S14, S18).

Item 35. A process according to any one of items 29 to 34, further comprising the step of delivering the waste object from the silo arrangement to a storage bin located vertically under the silo arrangement (Step S13).

Item 36. A process according to item 35, further comprising the steps of:

switching the silo arrangement from the first condition to the second condition (Step S14);

removing the storage bin for emptying or further transport (Step S16); and placing the emptied storage bin or another empty storage bin underneath the silo arrangement (Step S17).

Item 37. A process according to any one of the items 26 to 36, wherein the steps of the process is preceded by a step of devaluating the waste object (Step S1).

Item 101. A silo arrangement (400), for container return system backrooms, adapted to directly or indirectly receive waste objects (2), such as deposit-return objects, from a container return system (100) and to deliver the waste objects for storage or further transport, comprising at least one silo (401), wherein the silo (401) comprises:

a mouth (404) at a vertically seen upper end, adapted to receive a waste object (2);

a waste object chamber (405); and a hatch (406) at the lowermost end of the waste object chamber (405), adapted to release and deliver the waste object (2) for storage or further transport, wherein the silo arrangement (400) has a delivering condition, in which the hatch (406) is generally open, and a buffering condition, in which the hatch (406) is generally closed for buffering the waste objects (2) for delivery at a later point in time.

Item 102. A silo arrangement (400) according to item 101, wherein the silo arrangement (400) comprises a stand (402) on to which the silo (401) is arranged, in order for a storage bin (407) to be positionable vertically seen underneath the silo (401).

Item 103. A silo arrangement (400) according to item 102, wherein the stand (402) is provided with support uprights (403) to maintain the silo (401) at a distance from a ground on which the silo arrangement (400) is located.

Item 104. A silo arrangement (400) according to item 103, wherein a distance between at least one set of two adjacent support uprights (403) is adapted to accommodate a storage bin (407) there between.

Item 105. A silo arrangement (400) according to any one of the preceding items 101-104, wherein the silo arrangement (400) comprises at least two silos (401, 401') stacked on top of each other, wherein the stack of silos is arranged such that the uppermost silo (401) is adapted to receive the waste object (2), and adapted to release and deliver the waste object (2) to the silo (401') located vertically seen underneath the uppermost silo (401), and the bottommost silo (401') is adapted to release and deliver the waste object (2) for storage or further transport.

Item 106. A silo arrangement (400) according to any one of the preceding items 101-105, wherein the hatch (406) has a plurality of hatch sections (419, 420), each hatch section (419, 420) being pivotable about a respective pivot axis (424, 425) between a closed position, in which the silo arrangement (400) is in the buffering condition, and an open position, in which the silo arrangement (400) is in the delivering condition, and each pivot axis (424, 425) being mutually substantially parallel.

Item 107. A silo arrangement (400) according to item 106, wherein the hatch (406) has three hatch sections (412, 413, 414), the hatch sections in the open position being arranged in a generally similar pivotal position, whereby the hatch sections (412, 413, 414) generally overlap one another, and the hatch sections (412, 413, 414) in the closed position being arranged generally adjacent one another.

Item 108. A silo arrangement (400) according to item 107, wherein the hatch sections (412, 413, 414) at least partially along sides of each hatch section (412, 413, 414) which, in the closed position of the hatch (406), are located mutually adjacent, have latchings to interconnect mutually adjacent hatch sections (412, 413, 414).

Item 109. A silo arrangement (400) according to any one of the preceding items 101-108, further comprising at least one liquid nozzle (3) adapted to deliver a cleaning liquid (4), such as water, into the silo (401) for cleaning the silo arrangement (400) and/or the waste object (2).

Item 110. A silo arrangement (400) according to item 109, wherein the hatch (406) is drip tight in the buffering condition.

Item 111. A silo arrangement (400) according to item 110, wherein the at least one liquid nozzle (3) is controllable by a control unit for automatic controlling or scheduling of the cleaning of the silo arrangement (400) and/or the waste object (2).

Item 112. A silo arrangement (400) according to any one of the preceding items 101-111, wherein the hatch (406) is controllable by a control unit for automatic controlling or scheduling of opening and closing of the hatch (406).

Item 113. A silo arrangement (400) according to item 111 and item 112, wherein the hatch (406) and the at least one liquid nozzle (3) are controllable by the same control unit.

Item 114. A silo arrangement (400) according to any one of the preceding items 101-113, wherein a volume capacity of each silo (401) of the silo arrangement (400) is equal to or lower than a volume capacity of a storage bin (407) positioned underneath the silo arrangement (400).

The invention claimed is:

1. A system for collecting waste objects for recycling, said waste objects being deposit-return objects, comprising:

a container return system, having an inlet, recognition means, and an outlet for a waste object; and a carrier arrangement adapted to receive the waste object from the container return system at a first location having a first elevation, and adapted to transport and deliver the waste object to a second location for storage or further transport, the second location having a second elevation, the second elevation being positioned vertically higher relative to the first elevation, wherein the system further comprises a buffer arrangement adapted to receive the waste object from the container return system, and to deliver the waste object to the carrier arrangement at the first location, and the carrier arrangement comprises at least one carrier adapted to move repeatedly between the first location and the second location, wherein the carrier arrangement is a closed loop path carrier arrangement configured in such a way that the at least one carrier is adapted to move repeatedly between the first location and the second location along a closed loop path, a displacement of the at least one carrier from the first location to the second location occurring on a different portion of the path than a displacement of the at least one carrier from the second location to the first location, wherein said displacement of the at least one carrier between the first location and the second location is substantially vertical, wherein the at least one carrier is a paddle having a generally flat surface adapted to push said waste object in a tubular structure of the carrier arrangement, and wherein said closed loop carrier arrangement is configured to tilt said paddle downward to release the waste object from said paddle before said waste object reaches a top position of said closed loop path carrier arrangement.

2. A system according to claim 1, wherein the container return system is adapted to receive waste objects of different materials and/or different sizes, and the waste objects of different materials and/or different sizes are mixed together.

3. A system according to claim 2, wherein said system is configured for only accepting a certain range of objects, and the flat surface of said paddle is at least 30% shorter than the maximum length of the waste object that the system for collecting waste objects is configured to accept.

4. A system according to claim 1, wherein the buffer arrangement is adapted to receive the waste object from the container return system at a third location and wherein the buffer arrangement comprises sliding means adapted to transport the waste object from said third location to the first location.

5. A system according to claim 1, wherein a vertical distance between the first location and the second location is within the range of 50 cm to 400 cm.

6. A system according to claim 1, wherein the buffer arrangement is adapted to receive the waste object from the container return system irrespective of a location of the at least one carrier.

7. A system according to claim 1, further comprising at least one liquid nozzle adapted to deliver a cleaning liquid into at least one component of the system chosen from the group of the buffer arrangement and the carrier arrangement, for cleaning of the system and/or of the waste object and wherein at least one of the buffer arrangement and the carrier arrangement are adapted to collect, carry and deliver liquids concurrently with the waste object.

8. A system according to claim 1, wherein the carrier arrangement is a closed loop path carrier arrangement and comprises a plurality of carriers adapted to move repeatedly between the first location and the second location along said closed loop path.

9. A system according to claim 1, wherein the at least one carrier is adapted to transport and deliver at least 2 waste objects concurrently during a displacement between the first location and the second location.

10. A system according to claim 1, wherein the container return system is a reverse vending machine, RVM.

11. A system according to claim 10, wherein:

a horizontal distance between said inlet of the RVM and the second location is within the range of 50 cm to 200 cm and/or a vertical distance between said inlet of the RVM and the second location is within the range of 50 cm to 300 cm and/or a vertical distance between the first location and the second location is within the range of 50 cm to 300 cm and/or a vertical distance between the first location and the third location is within the range of 20 cm to 150 cm.

12. A process of transporting and collecting waste objects by a system for collecting waste objects for recycling, said waste objects being deposit-return objects, the system comprising a container return system, a buffer arrangement and a carrier arrangement, which carrier arrangement comprises at least one carrier adapted to move repeatedly between a first location having a first elevation and a second location having a second elevation, the second elevation being positioned vertically higher relative to the first elevation and vertically higher relative to said outlet of the container return system, wherein the process comprises the steps of:

receiving, by the buffer arrangement, a waste object from the container return system;

buffering the waste object by the buffer arrangement until the carrier arrangement is positioned to receive the waste object, delivering the waste object from the buffer arrangement to the carrier arrangement at the first location; and transporting and delivering the waste object by the carrier arrangement to the second location, wherein said carrier arrangement is configured to tilt said at least one carrier to release the waste object from said at least one carrier before said waste object reaches a top position of said carrier arrangement.

13. A process according to claim 12, wherein the step of transporting and delivering the waste object by the carrier arrangement to the second location comprises transporting the devaluated waste object by the at least one carrier in a substantially vertical displacement between the first location and the second location.

14. A system for collecting waste objects for recycling, said waste objects being deposit-return objects, comprising:

a carrier arrangement located to receive a devaluated waste object from an RVM at a first location having a first elevation, and adapted to transport and deliver the devaluated waste object to a second location for storage or further transport, the second location having a second elevation, the second elevation being positioned vertically higher relative to the first elevation, wherein the system further comprises a buffer arrangement located to receive the devaluated waste object directly from an outlet of the RVM at a third location having a third elevation different from the first and second elevations, and to deliver the devaluated waste object to the carrier arrangement at the first location, the carrier arrangement comprises at least one carrier adapted to move repeatedly between the first location and the second location, the second elevation being positioned vertically higher relative to said outlet of the RVM, wherein said carrier arrangement is configured to tilt said at least one carrier to release said devaluated waste object from said at least one carrier before said at least one carrier reaches a top position along a closed-loop path.

* * * * *